(12) United States Patent
Donnelly

(10) Patent No.: US 8,121,281 B2
(45) Date of Patent: Feb. 21, 2012

(54) INTERACTIVE PROCESS MAP FOR A REMOTE CALL CENTER

(75) Inventor: Robert Donnelly, Leander, TX (US)

(73) Assignee: Medical Service Bureau, Inc., Austin, TX (US)

( * ) Notice: Subject to any disclaimer, the term of this patent is extended or adjusted under 35 U.S.C. 154(b) by 1377 days.

(21) Appl. No.: 11/610,338

(22) Filed: Dec. 13, 2006

(65) Prior Publication Data
US 2008/0144801 A1 Jun. 19, 2008

(51) Int. Cl.
H04M 3/00 (2006.01)

(52) U.S. Cl. .............. 379/266.07; 379/265.09

(58) Field of Classification Search .......... 379/265.01, 379/265.02, 265.09, 266.07
See application file for complete search history.

(56) References Cited

U.S. PATENT DOCUMENTS

| | | | |
|---|---|---|---|
| 6,959,080 B2* | 10/2005 | Dezonno et al. | 379/265.07 |
| 7,515,693 B2* | 4/2009 | Salafia et al. | 379/45 |
| 7,783,030 B1* | 8/2010 | Bruening et al. | 379/266.07 |
| 2004/0080535 A1* | 4/2004 | Lueckhoff et al. | 345/758 |
| 2005/0086220 A1* | 4/2005 | Coker et al. | 707/4 |
| 2009/0296898 A1* | 12/2009 | Ragno et al. | 379/45 |

* cited by examiner

Primary Examiner — Olisa Anwah
(74) Attorney, Agent, or Firm — Margaret M. Anderson; Kahler Anderson, PLLC

(57) ABSTRACT

Provided is a method for operating a server computer to provide an interactive application to enable a plurality of client-specific protocols for a remote call center, the remote call center configured to receive a plurality of calls for a plurality of clients. The method includes linearly administering a plurality of states defined in a process map of client-specific protocols for a plurality of call types expected to be received for each client; displaying the process map at the remote call center via a graphical user interface; and enabling a client to remotely alter the process map over an internet connection in near real-time.

23 Claims, 24 Drawing Sheets

---

Linearly administer a plurality of states defined in a process map of client-specific protocols for a plurality of call types expected to be received for each client 410

Display the process map at the remote call center via a graphical user interface 420 providing the graphical user interface with a centrally visible panel for displaying a script for the staff at the remote call center to read and centrally-located process map predicted options to expect from a caller 4200

Enable a client to remotely alter the process map over an internet connection in near real-time 430

Display the process map via the internet connection as a database interface to enable the client to add, delete, and/or edit the client-specific protocols 4302

Display an option to the staff responsive to an input identifying the unique call type as beyond the scope of the process map 4304

Enable the remote call center to respond to an instruction received over the internet connection from the client by incorporating instructions received by the client into an interaction with a caller 4306

Enable staff at the remote call center to respond to a unique call type beyond the scope of the process map by providing a data information request to the client over the internet connection 440

Provide the process map as a health care-oriented process, the health care-oriented process including providing staff at the remote call center with protocols enabling collection of health care triage data for near real-time dissemination to the client 450

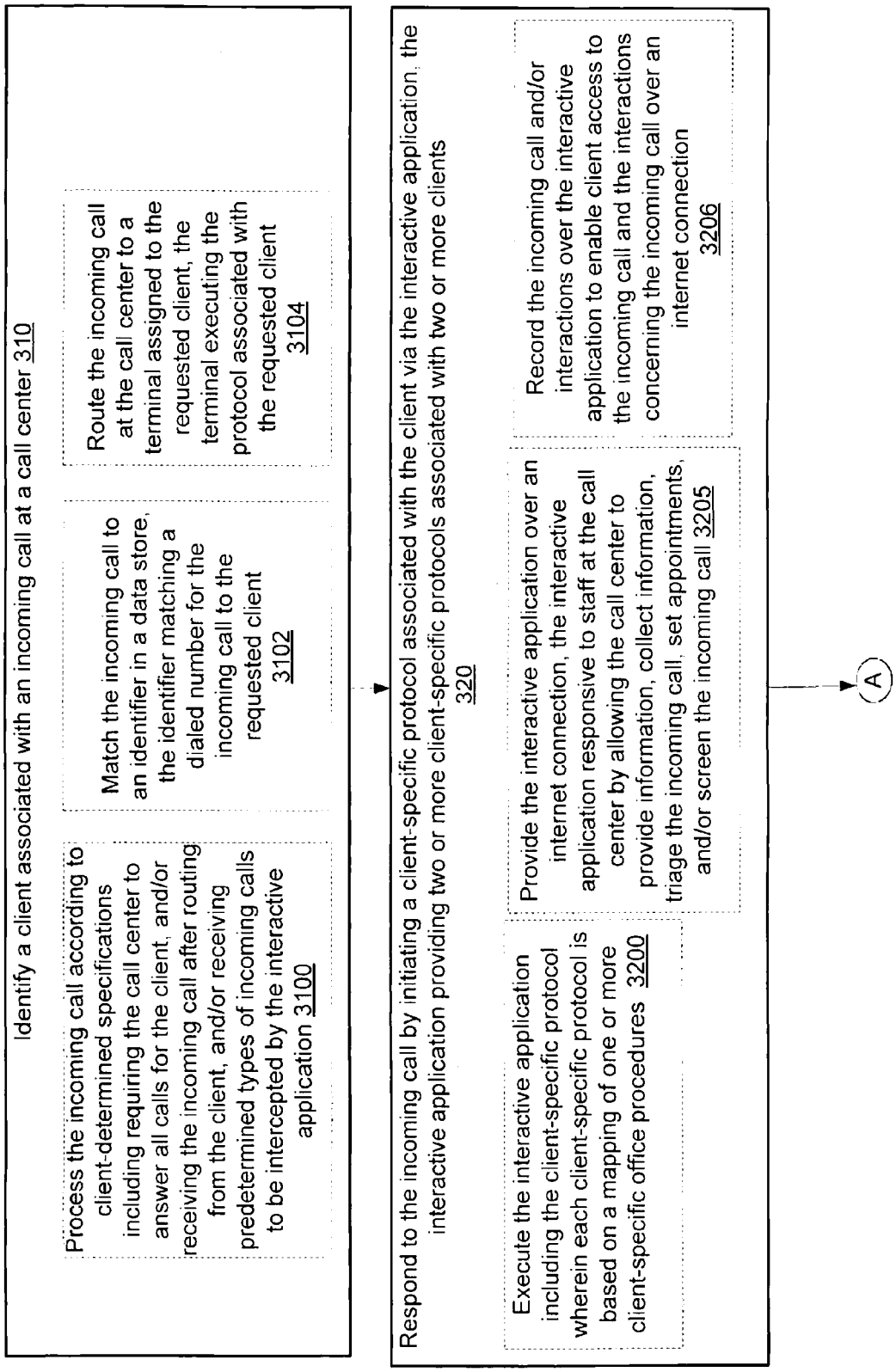

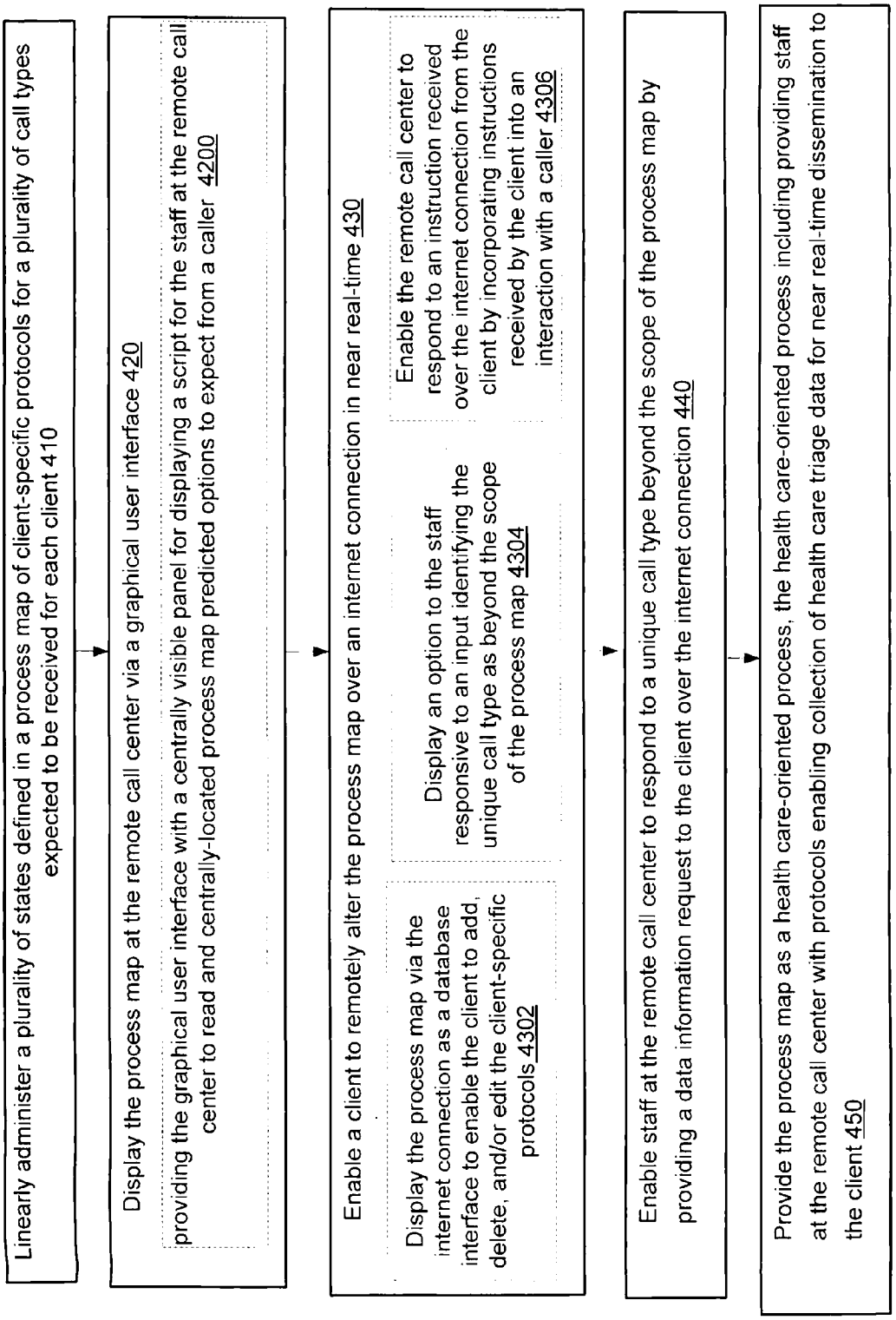

FIGURE 15

INTERACTIVE PROCESS MAP FOR A REMOTE CALL CENTER

CROSS-REFERENCE TO RELATED APPLICATION

The present application is related to U.S. patent application Ser. No. 11/610,334 filed on same date, to Donnelly, entitled "INTERACTIVE APPLICATION CALL CENTER METHOD AND SYSTEM," assigned to the present assignee, and incorporated herein by reference.

TECHNICAL FIELD

The present application relates generally to telephone call processing and call-routing systems and methods for customizing call procedures.

BACKGROUND OF THE INVENTION

Telephone call processing systems include computerized systems with hardware and software for remote call center systems. Remote call centers are known that perform call processing and such state-of-the-art call centers systems are typically computerized. Remote call centers include manned call centers wherein a staff processes calls on behalf of multiple clients. A remote call center with a staff processing incoming calls for multiple clients typically requires a trained staff capable of following different procedures set up for each client.

In the current art, although there are widely varying systems in the art relative to web-based control panels for setting up client rules, all such systems exhibit a common drawback. Typically such systems are programmed to follow certain routing rules and practices, and are not easily manipulated.

What is needed is method and apparatus which allows a client of a remote call center to configure, alter and customize the procedures and protocols that pertain only to that client.

SUMMARY

In one aspect, a method is provided for operating a server computer to provide an interactive application to enable a plurality of client-specific protocols for a remote call center, the remote call center configured to receive a plurality of calls for a plurality of clients. The method includes, but is not limited to, linearly administering a plurality of states defined in a process map of client-specific protocols for a plurality of call types expected to be received for each client; displaying the process map at the remote call center via a graphical user interface; enabling a client to remotely alter the process map over an internet connection in near real-time; and enabling staff at the remote call center to respond to a unique call type beyond the scope of the process map by providing a data information request to the client over the internet connection.

In one or more various aspects, related systems include but are not limited to circuitry and/or programming for affecting the herein-referenced method aspects; the circuitry and/or programming can be virtually any combination of hardware, software, and/or firmware configured to affect the herein-referenced method aspects depending upon the design choices of the system designer.

In one aspect, a computer system includes but is not limited to a processor; a memory coupled to the processor; and a interactive application module coupled to the memory, the interactive application module configured to respond to an incoming call received at a call center by and linearly administer a plurality of states in a process map associated with a client requested by the incoming call, the client designated by a caller identification, the interactive application module responsive to inputs to dynamically alter one or more of the plurality of states in the process map by a user over an internet connection. In addition to the foregoing, other system aspects are described in the claims, drawings, and text forming a part of the present application.

In one aspect, a computer program product includes but is not limited to a computer program product including a computer readable medium configured to perform one or more acts to enable a plurality of client-specific protocols for a remote call center, the remote call center configured to receive a plurality of calls for a plurality of clients, the one or more acts including one or more instructions for linearly administering a plurality of states defined in a process map of client-specific protocols for a plurality of call types expected to be received for each client; one or more instructions for displaying the process map at the remote call center via a graphical user interface; one or more instructions for enabling a client to remotely alter the process map over an internet connection in near real-time; and one or more instructions for enabling staff at the remote call center to respond to a unique call type beyond the scope of the process map by providing a data information request to the client over the internet connection.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the present application can be obtained when the following detailed description of the disclosed embodiments is considered in conjunction with the following drawings, in which:

FIG. 4 is a flow diagram of method in accordance with an embodiment of the present invention.

FIGS. 6-23 are a screen shots of an interactive application configured as a graphical user interface (GUI) in accordance with an embodiment of the present invention.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware.

The hardware portion can be implemented using specialized logic; the software portion can be stored in a memory or recording medium and executed by a suitable instruction execution system such as a microprocessor.

Embodiments herein provide an interactive application for use by an agent in a call center and by a plurality of clients, which could include businesses, with remote access to a server running the interactive application. From the perspective of the agent in the call center, the interactive application produces a user interface that enables an agent to interact with protocols that are specific to each client. Through this graphical user interface, call center staff can accept incoming calls, place calls, log breaks, update status information and interact with incoming calls to generate a call transaction for each call to the call center.

Figure 1:
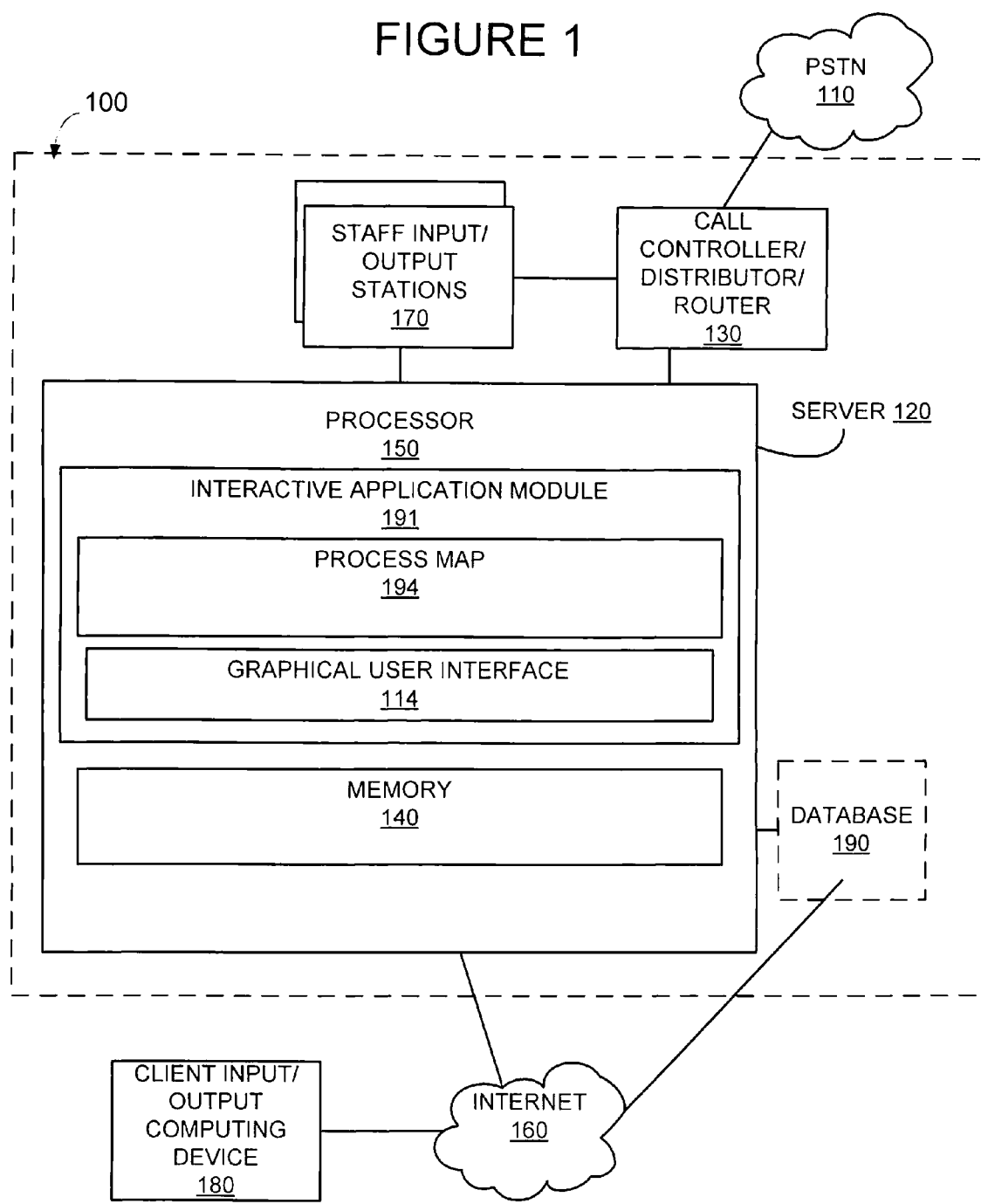
FIG. 1 is a block diagram of a call center network in accordance with an embodiment of the present invention.

FIG. 1 is a block diagram that illustrates a telecommunications network that is suitable for practicing the one or more embodiments of the present application. The telecommunications network includes a call center 100 that is connected to a public switched telephone network (PSTN) 110 via a voice trunk. Call center 100 can include a call controller/distributor/router 130 for controlling and routing incoming calls within the call center. Call controller/distributor/router 130 is connected to staff input/output stations 170. Agents are stationed at the stations 170 to handle calls on behalf of the call center 100. Call controller/distributor/router 130 is also connected to a server 120. Server 120 extracts call data from call controller/distributor/router 130. Server 120 is shown configured with processor 150, interactive application module 191, and memory 140. Disposed within interactive application module 191 is process map 194 and graphical user interface 114. Server 120 is also shown coupled to database 190, which can be associated with memory 140. Database 190 can be operably connected to server 120 and/or addressable via internet 160. Call center 100 is coupled to internet 160 which could be configured as any inter-networking configuration using world wide web configurations, internal configurations or public configurations for communication. Internet 160 is coupled to client input/output computing device 180 which enables clients to connect to call center 100 components and/or database 190.

It should be appreciated that the links connecting call controller/distributor/router 130 with other components of call center 100 may in some cases be implemented as local area network (LAN) connections. These data links may also be implemented as non-networked links. Those skilled in the art will appreciate that a call center 100 used to practice the embodiments herein may have a different configuration than that depicted in FIG. 1.

Figure 2:
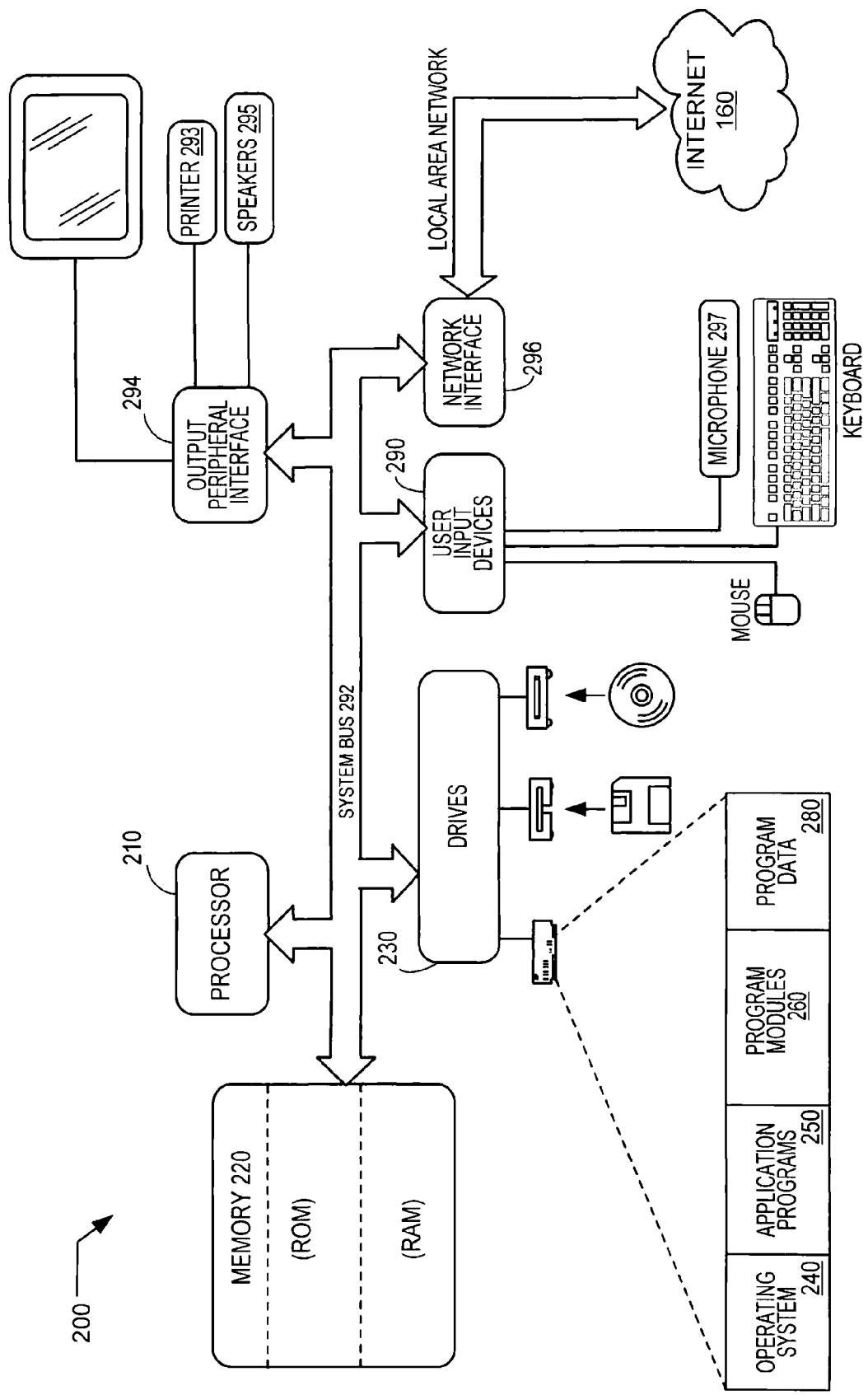
FIG. 2 is schematic diagram of an exemplary computer architecture that supports embodiments of the present invention.

FIG. 2 depicts a logical view of computer 200 that is exemplary for implementing one or more embodiments herein. FIG. 2 includes a computer 200, which could be a portable computer, including a processor 210, memory 220 and one or more drives 230. The drives 230 and their associated computer storage media, provide storage of computer readable instructions, data structures, program modules and other data for the computer 200. Drives 230 can include an operating system 240, application programs 250, program modules 260, and program data 280. Computer 200 further includes user input devices 290 through which a user may enter commands and data. Input devices can include an electronic digitizer, a microphone 297, a keyboard and a pointing device, commonly referred to as a mouse, trackball or touch pad. Other input devices may include a joystick, game pad, satellite dish, scanner, and the like. In one or more embodiments, user input devices 290 can direct display or instantiation of applications running on processor 210. For example, computer 200 can be configured to operate as a staff input/output station 170 and/or be implemented as a server 120 as illustrated in FIG. 1, such that user inputs interact with interactive application module 191, process map 194 and graphical user interface 114.

These and other input devices can be connected to processor 210 through a user input interface that is coupled to a system bus 292, but may be connected by other interface and bus structures, such as a parallel port, game port or a universal serial bus (USB). Computers such as computer 200 may also include other peripheral output devices such as speakers and/or display devices, which may be connected through an output peripheral interface 294 and the like. In particular, in one embodiment, computer 200 is coupled to printer 293 and speakers 295.

Computer 200 may operate in a networked environment using logical connections to one or more remote computers, such as a remote computer or remote network printer. The remote computer can include e a personal computer, a server, a router, a network PC, a peer device or other common network node, and may include many if not all of the elements described above relative to computer 200. Networking environments are commonplace in offices, enterprise-wide computer networks, intranets and the internet 160. For example, in the subject matter of the present application, computer 200 may comprise the source machine from which data is being migrated, and the remote computer may comprise the destination machine. When used in a LAN or WLAN networking environment, computer 200 is connected to the LAN through a network interface 296 or an adapter and can connect with internet 160. When used in a WAN networking environment, computer 200 typically includes a modem or other means for establishing communications over the WAN to environments such as the Internet 160.

Figure 3B:
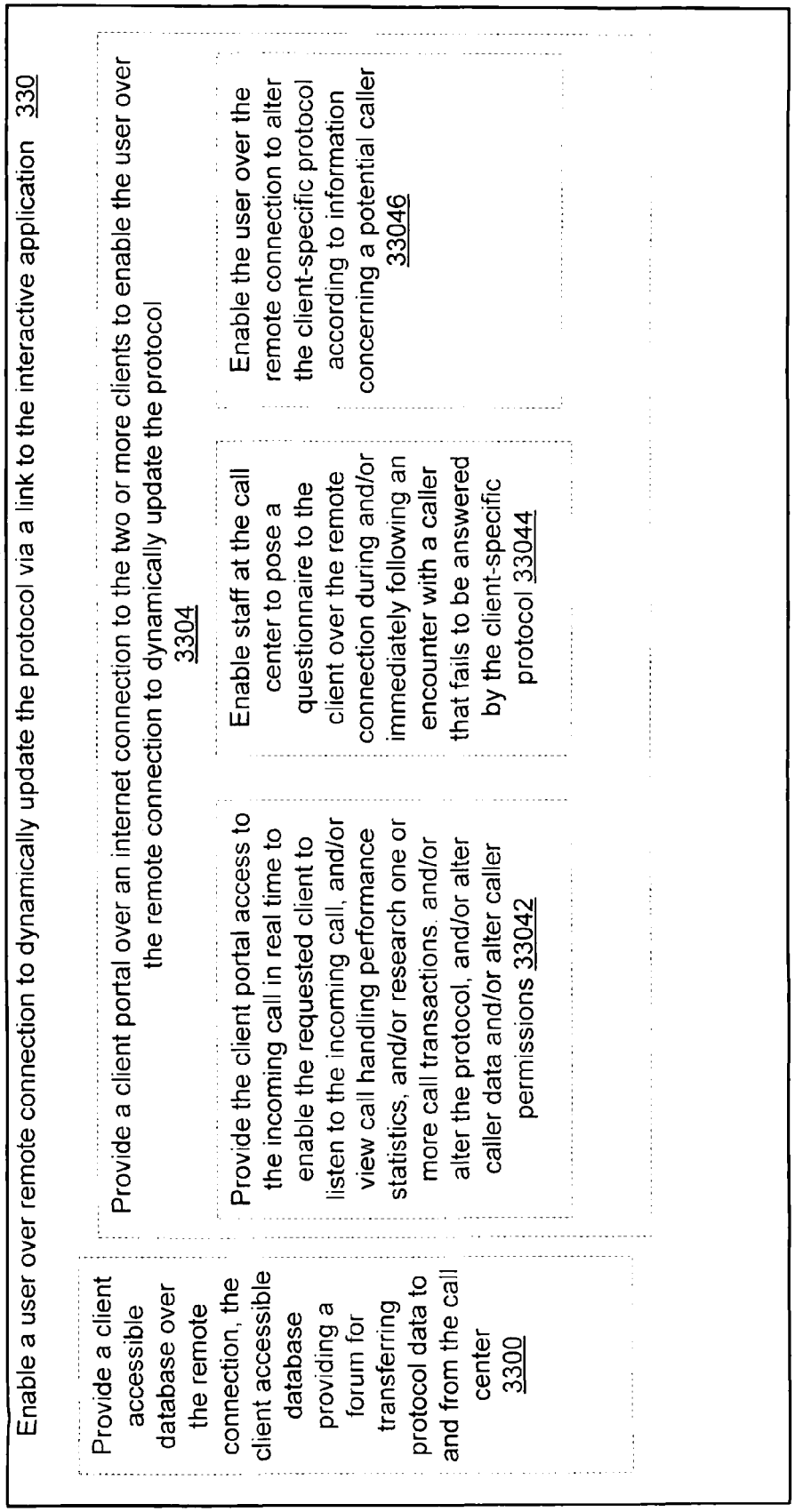
FIG. 3 is a flow diagram of method in accordance with an embodiment of the present invention.

Referring now to FIG. 3, a block diagram illustrates a method for an interactive application for a call center in accordance with an embodiment. Block 310 provides for identifying a client associated with an incoming call at the call center. For example, call center can receive an incoming call designated for a particular client, as known by the number called by a given caller.

Depicted within block 310 is block 3100 which provides for processing the incoming call according to client-determined specifications including requiring the call center to answer all calls for the client, and/or receiving the incoming call after routing from the client, and/or receiving predetermined types of incoming calls to be intercepted by the interactive application. More specifically, the identifying a client can include options determined by the client for call processing. In one option, a client can direct that all calls are answered by the call center. In another option, calls can be routed such that the client receives all calls and those that are diverted to the call center are determined according to some metric. For example, overflow calls can be sent to the call center. Alternatively, calls for which a client has identified as a type for forwarding to the call center can also be sent to the call center by interception. Also depicted is block 3102 which provides for matching the incoming call to an identifier in a data store, the identifier matching a dialed number for the incoming call to the requested client. The identifier can be either a phone number or a link to a phone number as is known in the art.

Also depicted within block 310 is block 3104 which provides for routing the incoming call at the call center to a terminal assigned to the requested client, the terminal executing the protocol associated with the requested client. The terminal can be a computer such as computer 200 or a server or the like. For example, processor 210 can execute the protocol associated with the requested client.

Block 320 provides for responding to the incoming call by initiating a client-specific protocol associated with the client via an interactive application, the interactive application providing two or more client-specific protocols associated with two or more clients. More specifically, block 320 relates to instantiating an interactive application that provides client-specific protocols for dealing with calls received by the call center. Each client can direct calls to the call center and can have a specific protocols directed toward serving callers for that client. The interactive application can be instantiated by an agent operating a computer system upon receiving an incoming call on behalf of a client. Depicted within block 320 is block 3200, which provides for executing the interactive application including the client-specific protocol wherein each client-specific protocol is based on a mapping of one or more client-specific office procedures.

Also depicted within block 320 is block 3205 which provides that the interactive application can be over an internet connection, the interactive application responsive to staff at the call center by allowing the call center to provide information, collect information, triage the incoming call, set appointments, and/or screen the incoming call.

Also depicted within block 320 is block 3206, which provides for recording the incoming call and/or interactions over the interactive application to enable client access to the incoming call and the interactions concerning the incoming call over an internet connection.

Block 330 provides for enabling a user over remote connection to dynamically update the protocol via a link to the interactive application. The client-specific protocols instantiated with the interactive application can be updated on-the-fly or at scheduled periods by a client or user that has access to the protocols. Depicted within block 330 is block 3300 which relates to providing a client accessible database over the remote connection, the client accessible database providing a forum for transferring protocol data to and from the call center. The client accessible database can be accessible as database 190 accessible over the internet or the like, as shown in FIG. 1.

Also depicted within block 330 is block 3304 which provides for providing a client portal over an internet connection to the two or more clients to enable the user over the remote connection to dynamically update the protocol. The portal can include an internet 160 portal or other portal as is known in the art to enable a remote connection.

Depicted within block 3304 is block 33042 which relates to providing the client portal access to the incoming call in real time to enable the requested client to listen to the incoming call, and/or view call handling performance statistics, and/or research one or more call transactions, and/or alter the protocol, and/or alter caller data and/or alter caller permissions. Also depicted within block 3304 is block 33044 which provides for enabling staff at the call center to pose a questionnaire to the client over the remote connection during and/or immediately following an encounter with a caller that fails to be answered by the client-specific protocol. The questionnaire can be a web-based application accessible over server 120 communicating to stations 170.

Also depicted within block 3304 is block 33046 which provides for enabling the user over the remote connection to alter the client-specific protocol according to information concerning a potential caller.

Referring now to FIG. 4, a flow diagram illustrates an embodiment of a method for operating a server computer, such as server 170 to provide an interactive application to enable a plurality of client-specific protocols for a remote call center that receives calls for a plurality of clients. Block 410 provides for linearly administering a plurality of states defined in a process map of client-specific protocols for a plurality of call types expected to be received for each client. Block 420 provides for displaying the process map at the remote call center via a graphical user interface. Depicted within block 420 is block 4202 which provides for providing the graphical user interface with a centrally visible panel for displaying a script for the staff at the remote call center to read and centrally-located process map predicted options to expect from a caller.

Block 430 provides for enabling a client to remotely alter the process map over an internet connection in near real-time. Depicted within block 430 is block 4302 which provides for displaying the process map via the internet connection as a database interface to enable the client to add, delete, and/or edit the client-specific protocols. In one embodiment, the database interface enables the client to enter one or more records specific to a caller, a caller type, and/or an individual requested by a caller.

Also depicted in block 430 is block 4304 which provides for displaying an option to the staff responsive to an input identifying the unique call type as beyond the scope of the process map. Also depicted in block 430 is block 4306 which provides for enabling the remote call center to respond to an instruction received over the internet connection from the client by incorporating instructions received by the client into an interaction with a caller.

Figure 5:
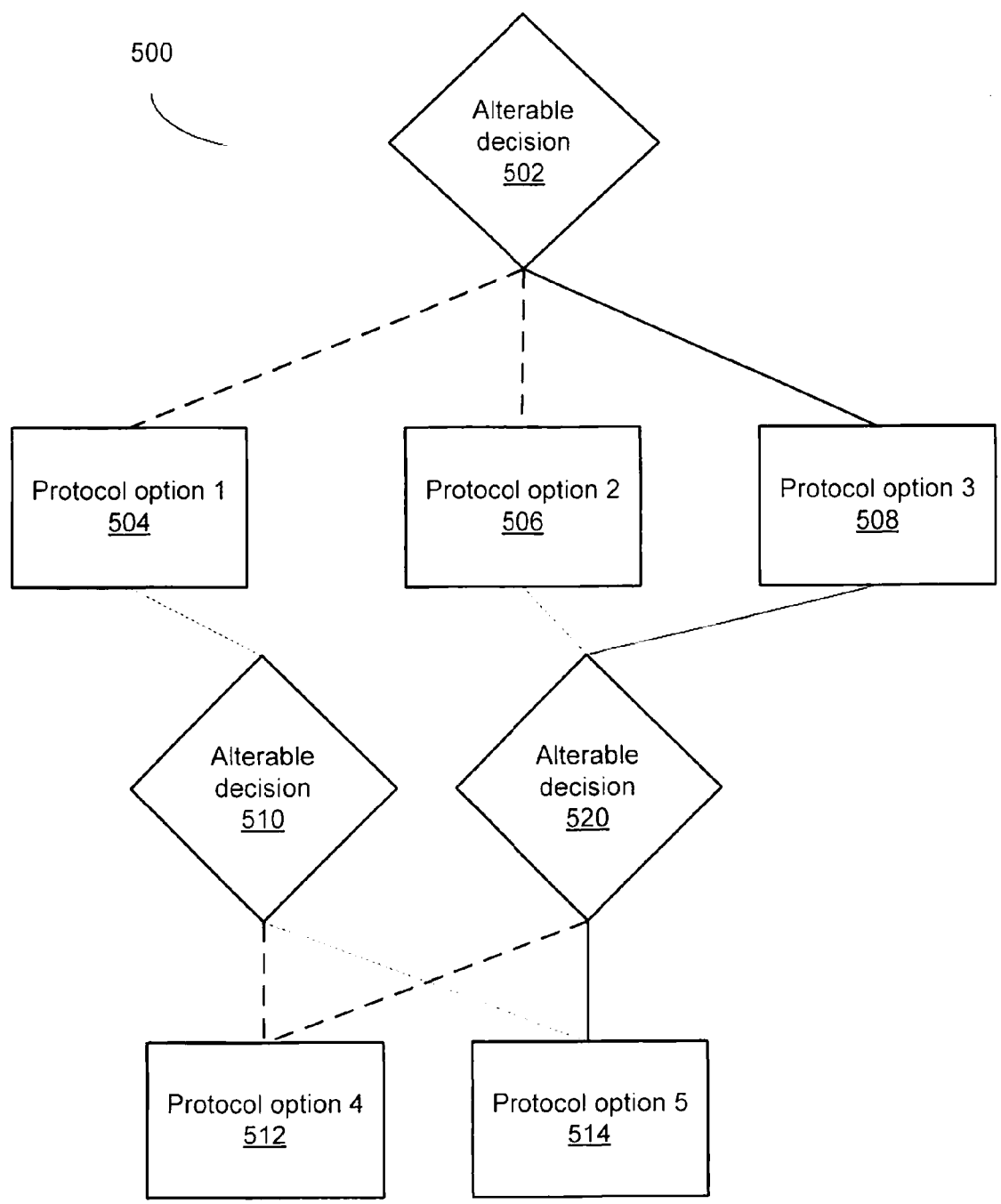
FIG. 5 is a schematic diagram of a process map in accordance with an embodiment of the present invention.

Referring now to FIG. 5, a sample process map is illustrated in accordance with an embodiment. Specifically, FIG. 5 illustrates where a client can alter a decision flow to enable different protocol options in an interactive application. For example, a client can alter decision 502 to enable either protocol option 1 504, protocol option 2 506 or protocol option 3 508. Each protocol option can provide a different response for the call center staff or another method for dealing with incoming calls. In one embodiment, one or more of alterable decisions 502, 510 and 520 are changeable in real time to alter the progression of the interactive application. In one embodiment, the alterations can relate to targeted advertising such that, for example, a promotional discount can be applied and controlled by a client. In another embodiment, the alterable decision 502 can relate to advertising for a time limited purpose, such as for a seminar or other event with limited seating.

Additionally, the alterable decision 502, 510 and 520 can be configured to affect pricing offered through the call center to enable changes from flat fee charging to variable charging and the like. Also illustrated are protocol option 4 512 and protocol option 5 514 which illustrate that an alterable decision can affect how a station agent handles a next call. In the process map illustrated, a default path flows from decision 502, to protocol option 3 508 to alterable decision 520 to protocol option 5 514 as indicated by the bold lines. A client can alter the path taken by a station agent receiving a next call by directing that optional protocols be followed. For example, if an emergency situation occurs in an office whereby further appoints cannot be taken, protocol option 1 504 can include that no appointments should be made. Therefore, a next call after a client has manipulated alterable decision 502 would be treated according to the altered process map. The process map would direct the agent to inform all subsequent callers that no appointments are allowed.

Figure 6:
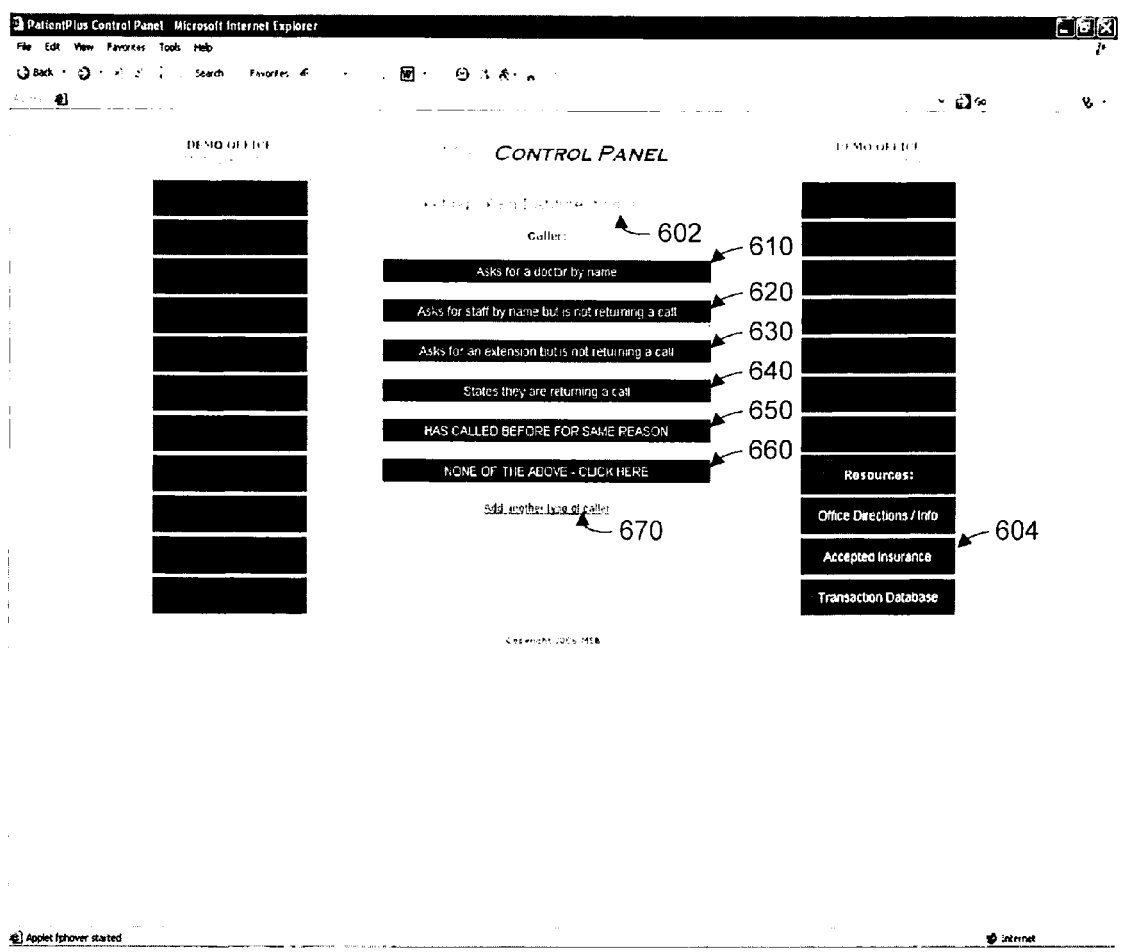

Referring now to FIG. 6, an interactive application is configured as a graphical user interface (GUI) that is responsive to alterations performed via a process map such as process map 500. As shown, the GUI includes a centrally-located option panel that provides a call center agent with different scenarios for a caller after greeting 602. The GUI presents options for altering the GUI in real time by a client according to process map 500. The links for providing a client with options can be made available to a client or to an agent operating the GUI according to system configurations. For example, a client can direct an agent to make changes verbally or can direct the changes independently over a network connection.

In the exemplary GUI, a caller can ask for a doctor by name 610, ask for staff by name but not be returning a call 620, ask for an extension but not be returning a call 630, returning a call 640, be a repeat caller 650, or none of the above 660. If an agent needs to add another type of caller, an option to identify a new type of caller is provided 670. Along the side of the GUI, optional information links are provided 604 that enable an agent to provide office directions, insurance information and access to a relevant database.

Figure 7:
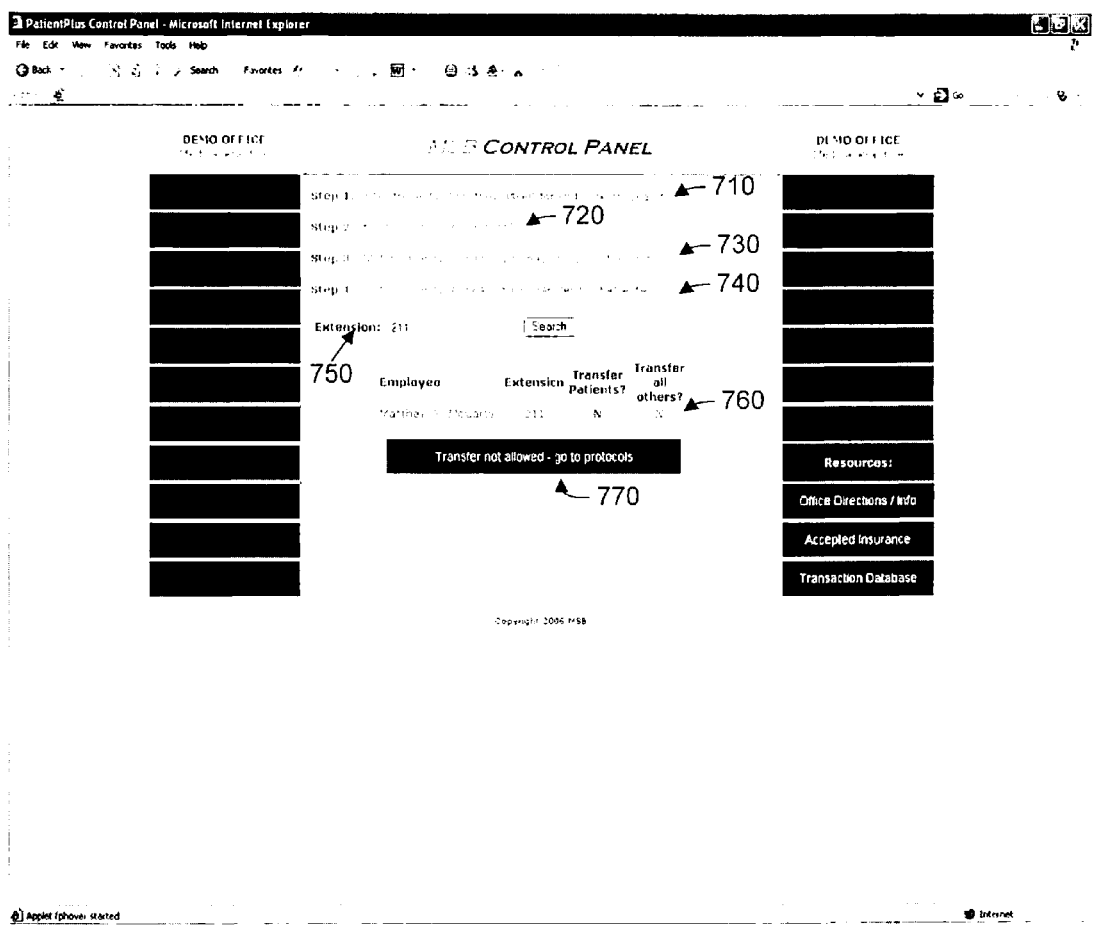

Referring to FIG. 7, a linked page of the GUI is illustrated that would appear after an agent chooses an option from the types of calls 710-750. More specifically, if an extension is asked for by the caller 710, instructions are provided. If the extension is not available, step 2 provides to go to protocols 720. Step 3 provides instructions for an agent for callers that require consideration of client-defined protocols. Step 4 provides instructions for an agent when a blind transfer to an extension is required. The extension for transferring calls is provided with a search tool 750. After retrieving the matching information associated with an extension, 760 provides instructions regarding the types of calls permitted for transfer. If no transfer is allowed in any case, the GUI highlights that option in block 770.

Figure 8:
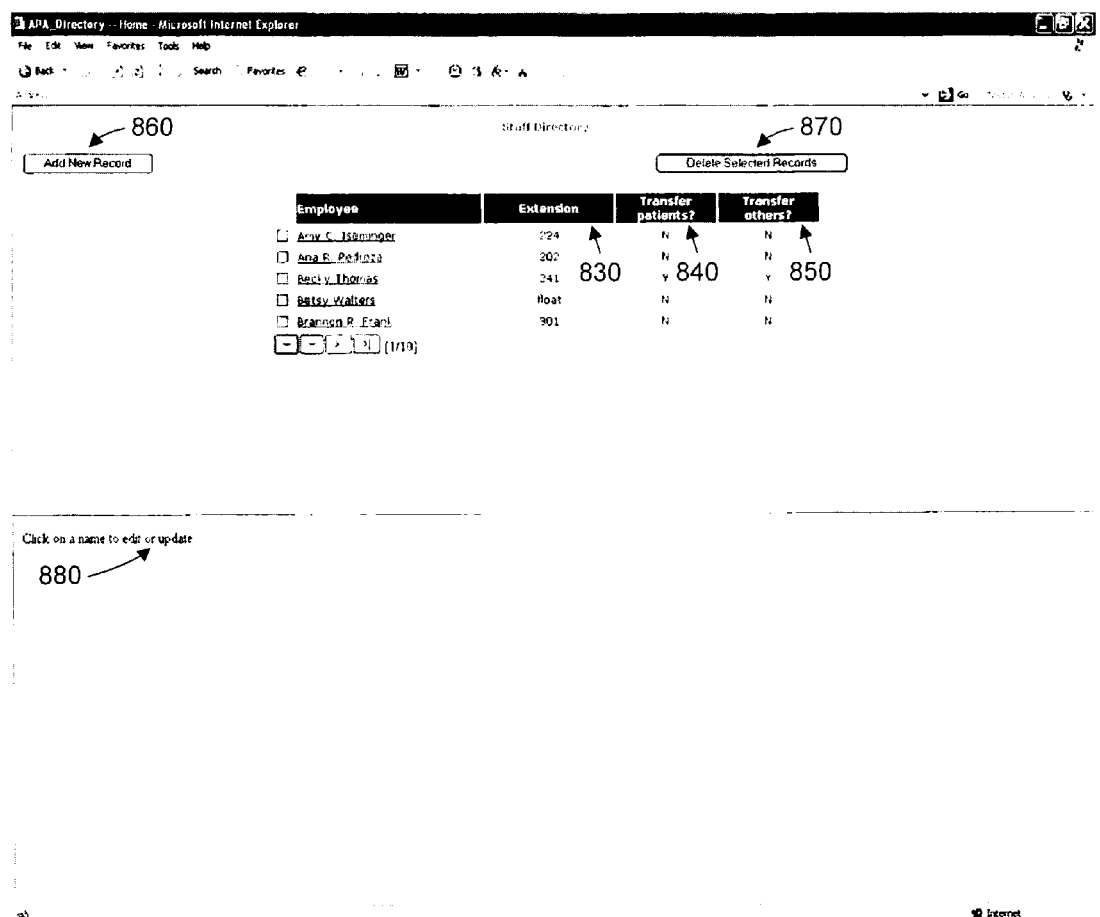

FIG. 8 illustrates an exemplary staff directory available to an agent by organizing the data in a table with extension 830, transfer options 840 and 850. A client can choose to direct an agent or independently add a new record 860, delete a record 870, or to edit a current record 880. Each of the client choices can be provided in the process map 500 as alterable decisions (512, 510, 520) or the like.

Figure 9:
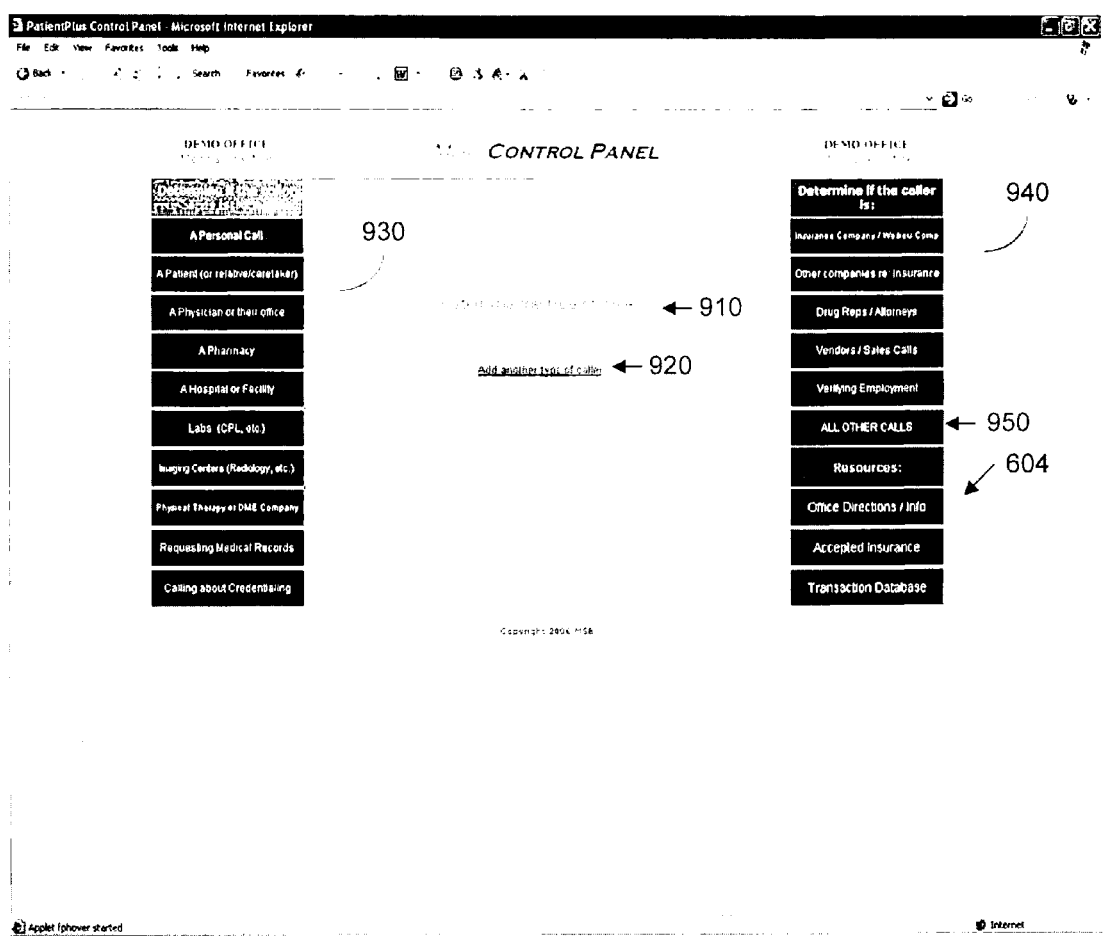

FIG. 9 illustrates another page of the GUI that organizes options for an agent according to the type of caller. More specifically, different types of callers for a medical office are provided in sidebars 930 and 940 including: a personal call, a patient or relative of a patient, a physician in the office, a pharmacy, a hospital or facility, a lab, an imaging center, a physical therapy office, a request for medical records, a call concerning credentialing, an insurance company or workers compensation company, other companies, drug representatives and attorneys, sales call, and verification of employment. An option for all other calls is included for those calls not specifically identified 950. The "all other calls" trap enables a call agent to most closely match the nature of the call for the appropriate department or staff. Other options that could be relevant to the call are included as shown in FIG. 6, including useful information 604.

Figure 10:
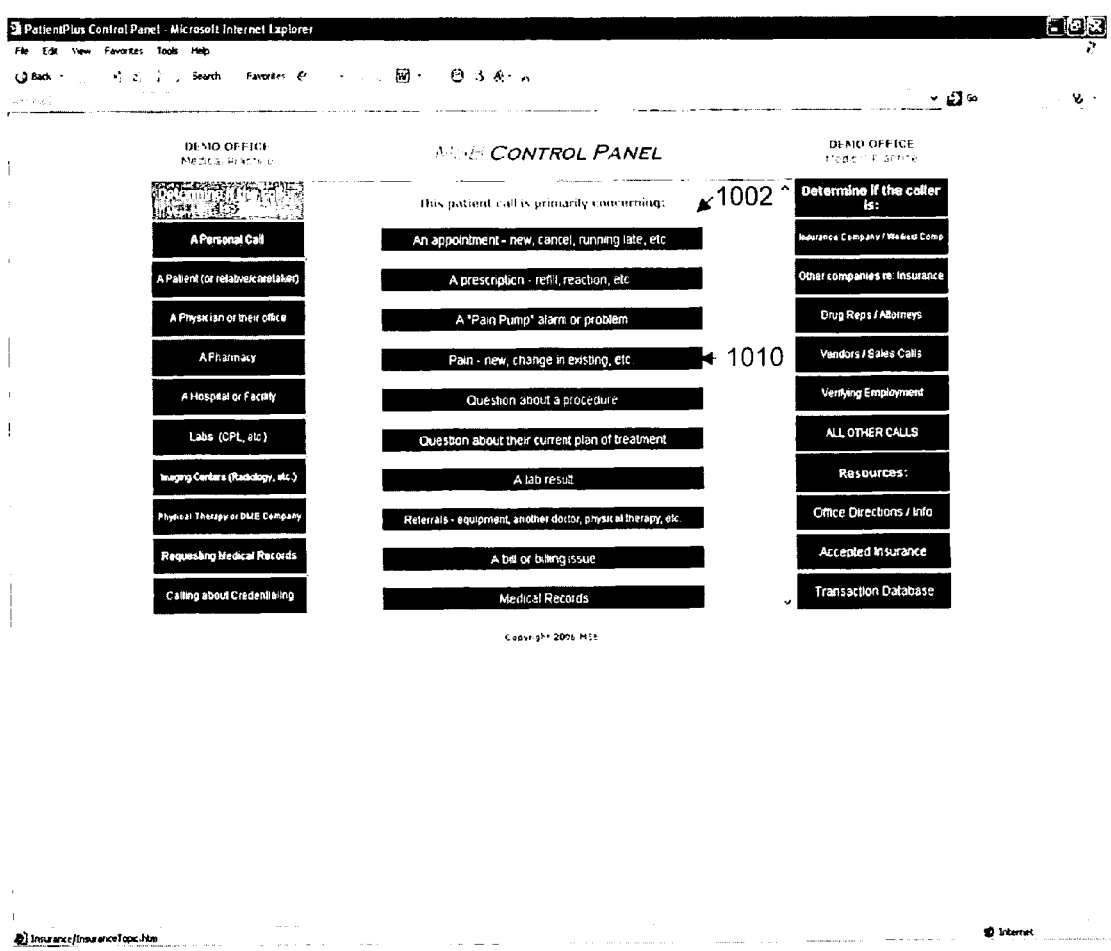

Referring now to FIG. 10, if a caller is a patient, the center of the GUI is populated with options concerning what the patient could be calling about 1002. Specifically, options included in an exemplary call include: an appointment issue, a prescription, a problem issue, a pain issue that is new or a change 1010, a question about a procedure, a question about their current plan of treatment, a lab result, a referral issue, a bill or billing issue, and a medical records issue.

Figure 11:
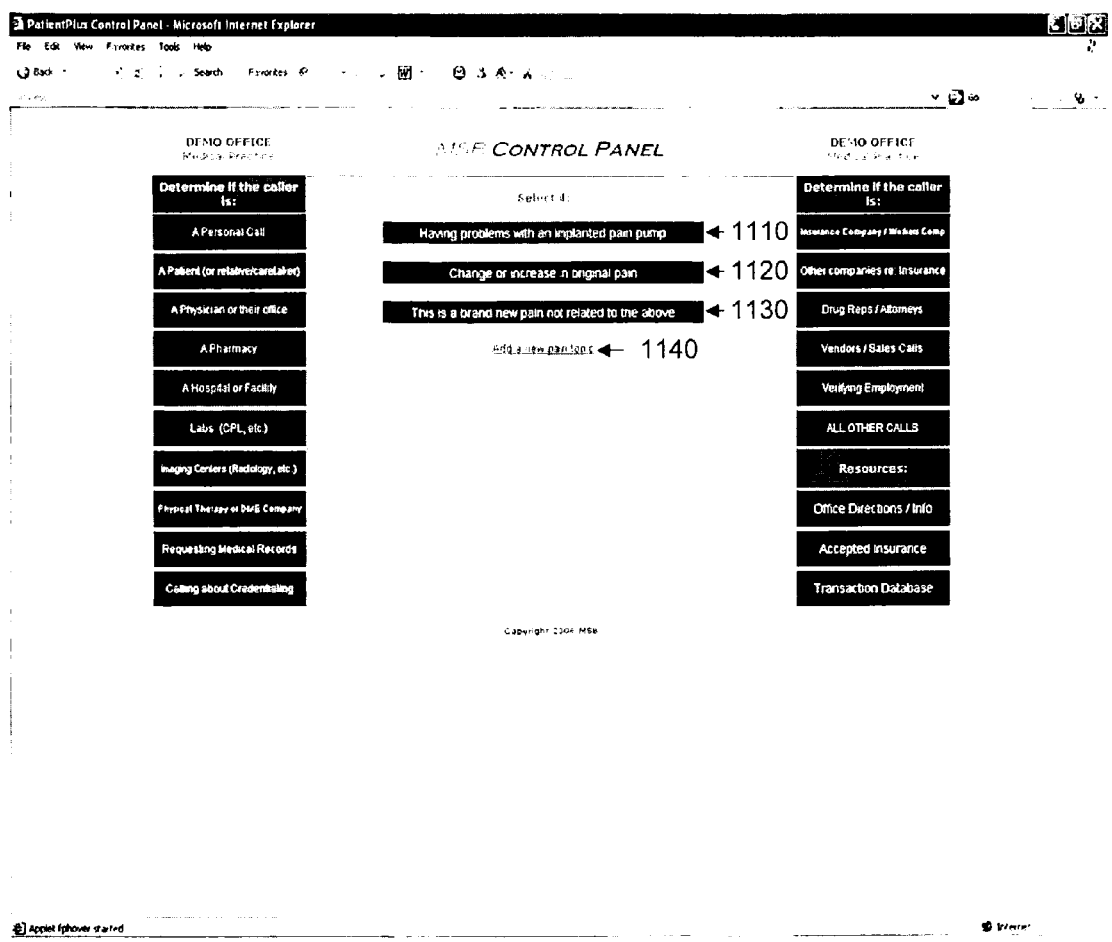

Referring to FIG. 11, in the exemplary GUI, a patient is having in issue related to a new or change in pain, so an agent would click on button 1010 shown in FIG. 10. The center portion of the GUI alters according to the choice determined in the previous slide. Specifically, the options provided in the exemplary GUI include "having problems with an implanted pain pump" 1110; "change or increase in original pain" 1120; "this is a brand new pain not related to the above" 1130. A client and/or agent is given an opportunity to add a new pain topic 1140.

Figure 12:
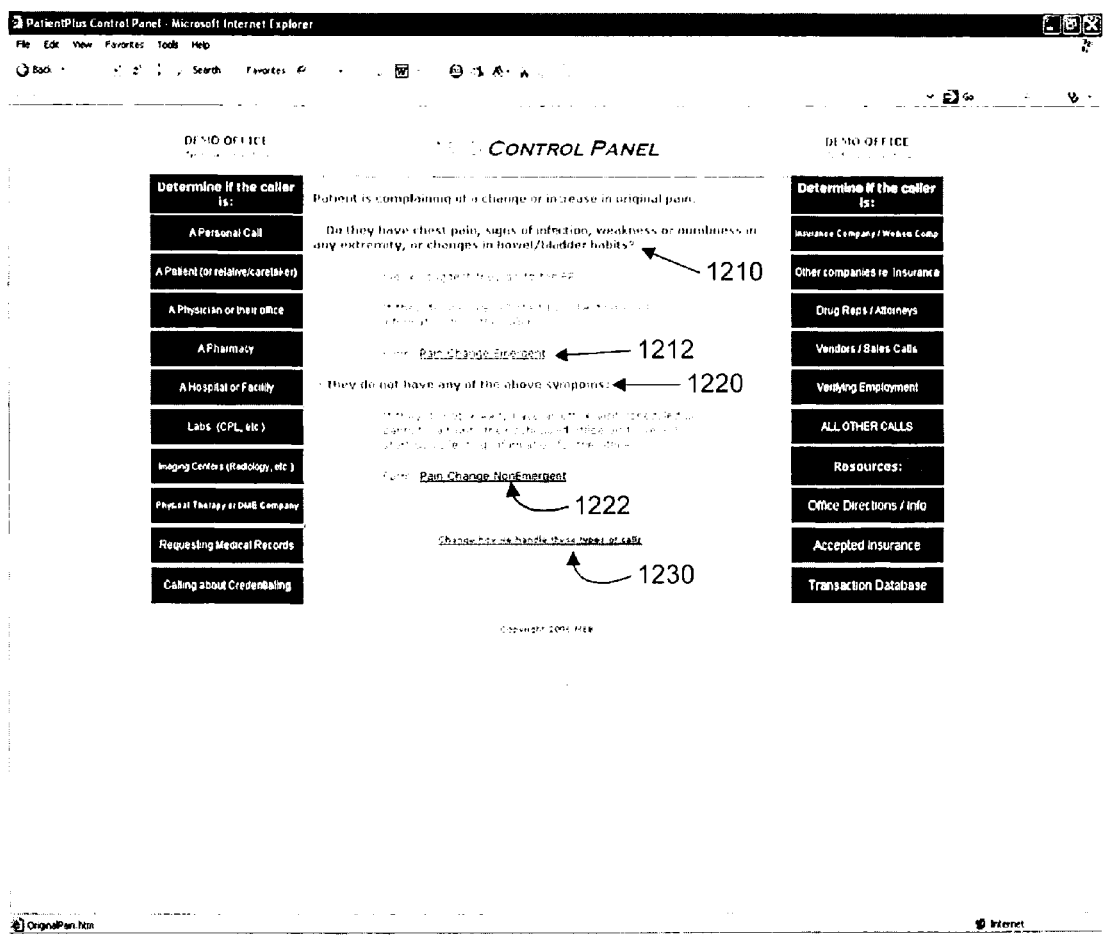

Referring to FIG. 12, the GUI alters the center portion according to the choice determined by the agent. In this example, the agent clicks on the "change or increase in original pain" option 1120. Thus, each topic can, when selected, present additional subtopics to guide the call agent in a linear manner through the defined call handling protocols. As a result, options are loaded including "Do they have chest pain, signs of infection, weakness or numbness in any extremity, or changes in bowel/bladder habits?" 1210; and "They do not have any of the above symptoms" 1220. Also provided are suggestions for an agent to provide to the caller including a suggestion that the caller go to the ER, and if they decline to collect information from the caller. For information from the caller, a form link "Pain Change Emergent" 1212 is displayed. If a caller does not already has an office visit scheduled or cannot wait until a scheduled office visit, a form link "Pain Change NonEmergent" 1222 is displayed. Optionally, how these types of calls are handled can be changed by a client and/or agent 1230. The suggestions to the call agent can be individualized protocols for the client that appear once all subtopics have been exhausted.

Figure 13:
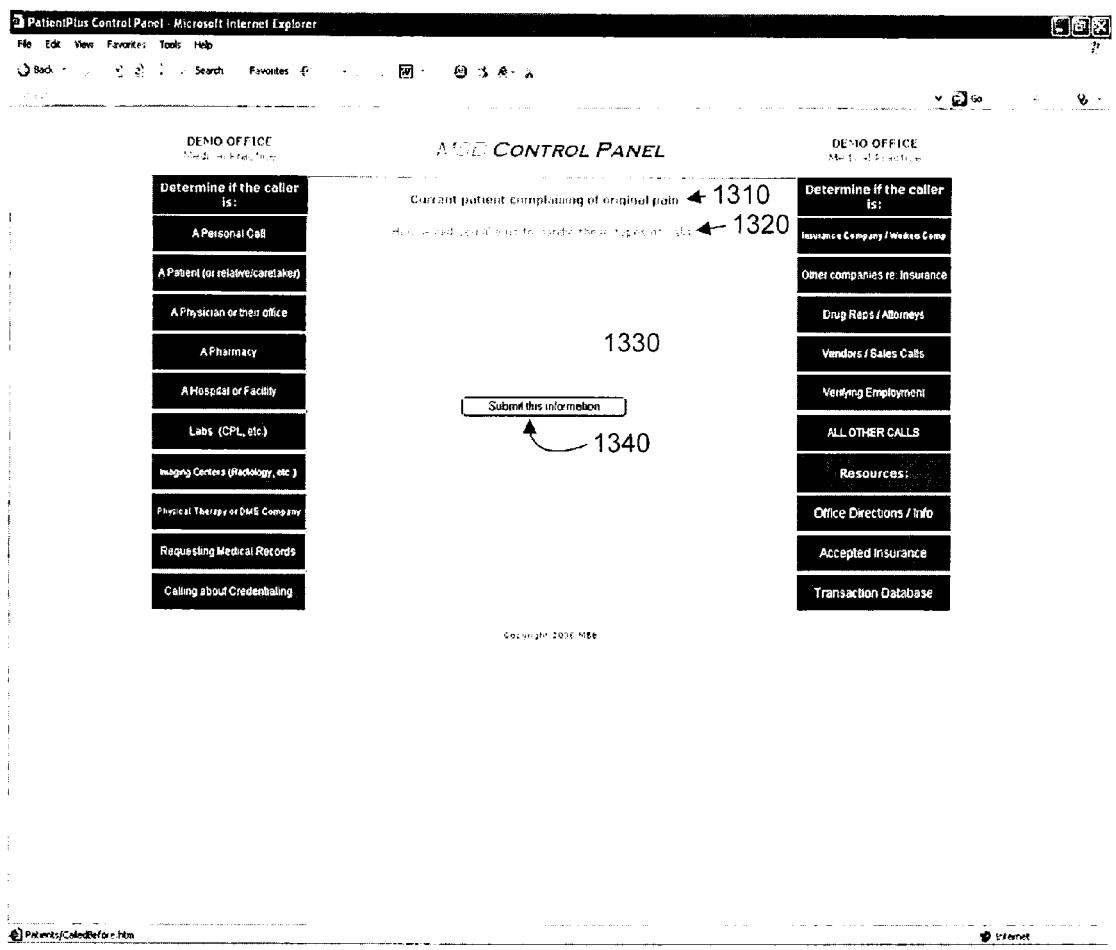

Referring to FIG. 13, the center portion of the GUI provides a form when a client and/or agent clicks option 1230. Specifically, the title of the form is "Current patient complaining of original pain" 1310. A question "How would you like us to handle these types of calls?" 1320 is below the title 1310. Below the question, an interactive form provides space for a client and/or agent to provide handling instructions 1330. Once complete, the client and/or agent submits the information by clicking link 1340.

Figure 14:
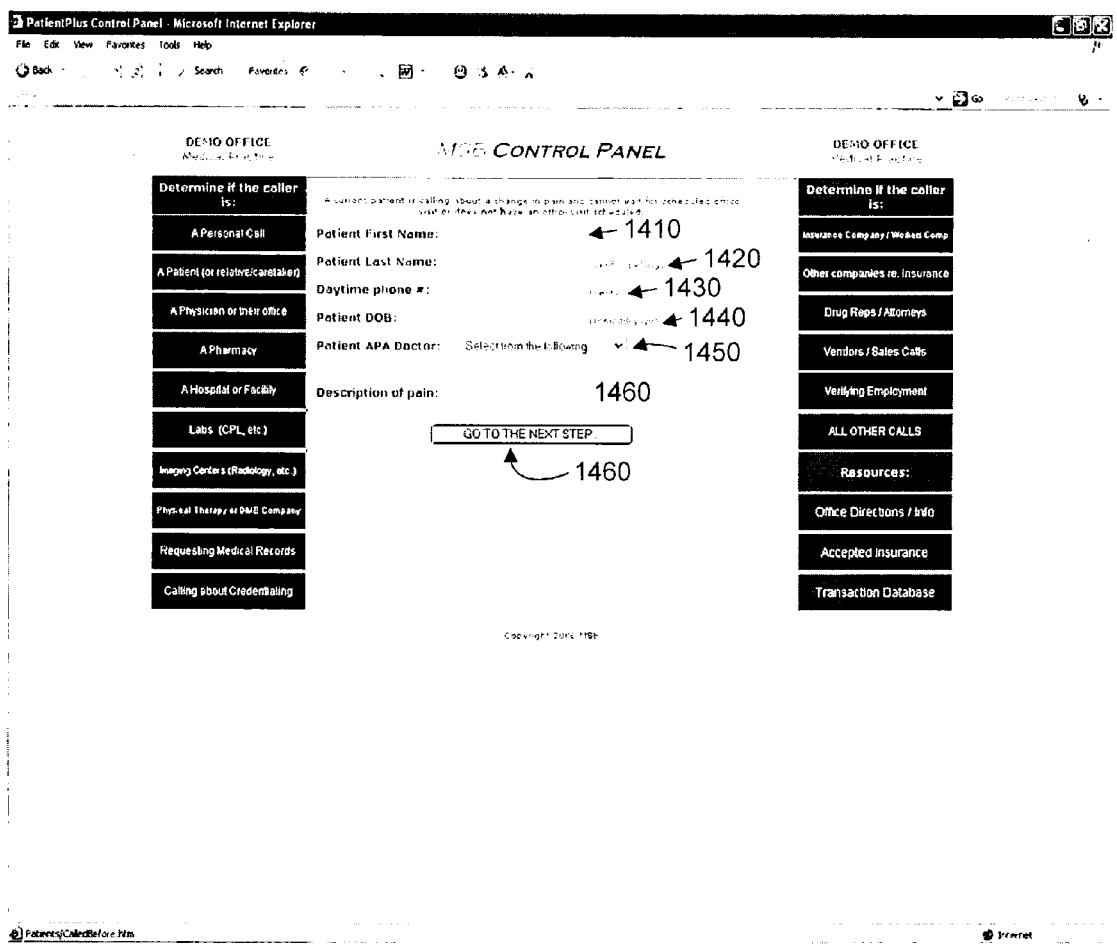

Referring to FIG. 14, if an agent clicks on option 1212 "Pain Change NonEmergent" in FIG. 12, the center portion of the GUI illustrates an interactive form for providing information about a patient. Specifically, the form allows an agent to provide the patients first name 1410; last name 1420; daytime phone number 1430, date of birth 1440; doctor associated with patient 1450; and description of pain 1460. The GUI also allows the agent to go to the next step 1460.

Figure 15:
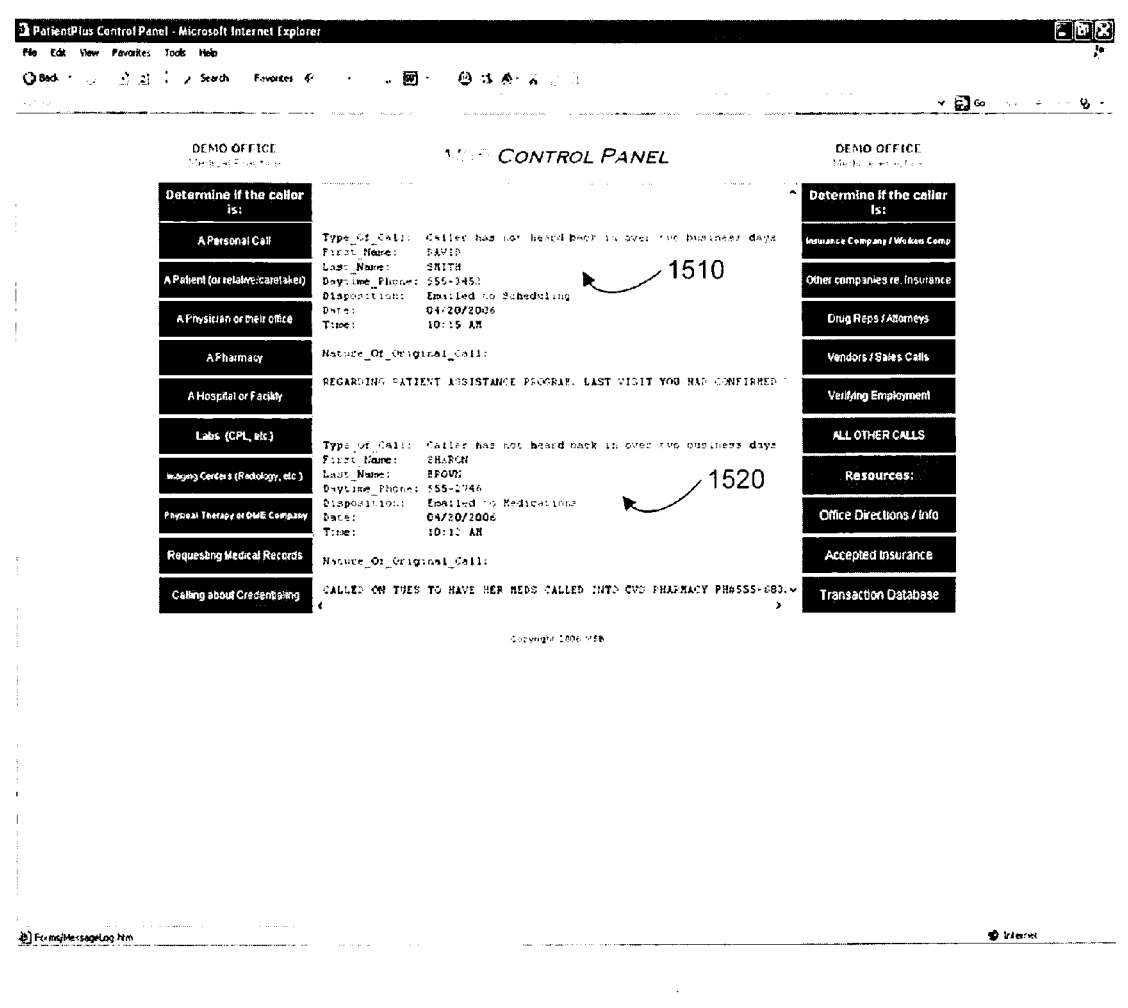

Referring now to FIG. 15, the GUI can provide a client with a summary of the calls received by an agent at the call center. Specifically, the control panel GUI illustrates a call summary 1510 and a call summary 1520. In call summary 1510, the type of call recites that the caller has not heard back in over two business days, provides the caller name, phone number, disposition of the call, date and time. The nature of the original call is provided as "regarding patient assistance program." In call summary 1520, the type of call is given as "Caller has not heard back in over two business days", name, phone, disposition is given as "emailed to medications", date, time and nature of original call "called on Tues to have her meds called into CVS pharmacy". The information illustrated in the center panel can be emailed to the client and/or stored in a database. In one embodiment, the transaction log illustrated in FIG. 15 is available as an online transaction log that is available to the client and can be searched using a web browser.

Figure 16:
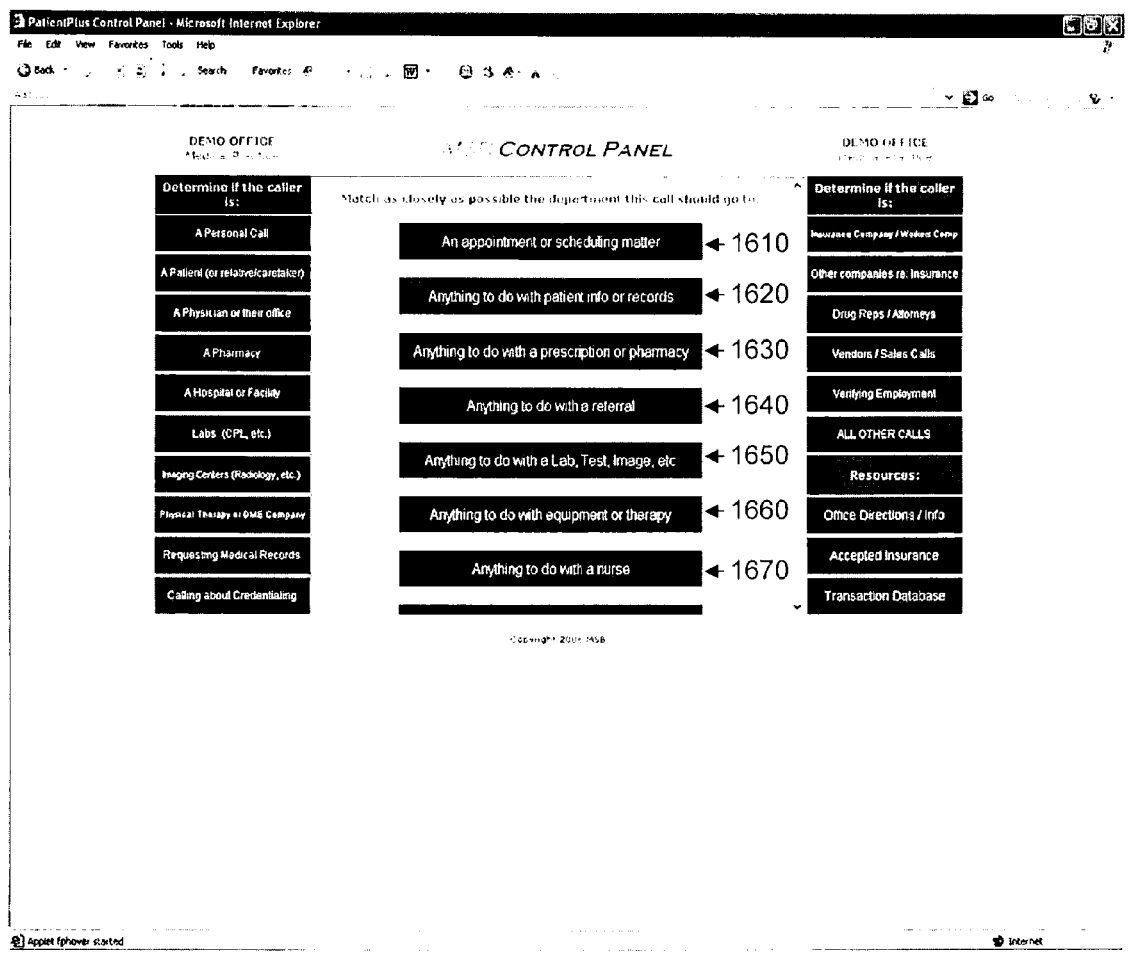

Referring now to FIG. 16, the GUI is further designed to provide a call center agent with options located centrally on the GUI. Specifically, as shown, a client can provide the various types of calls the call center can expect and these are included in the GUI for that client. Options include "an appointment or scheduling matter" 1610; "anything to do with patient info or records" 1620; "anything to do with a prescription or pharmacy" 1630; "anything to do with a referral" 1640; "anything to do with a Lab, Test, Image, etc." 1650; "anything to do with equipment or therapy" 1660; "anything to do with a nurse" 1670.

Figure 17:
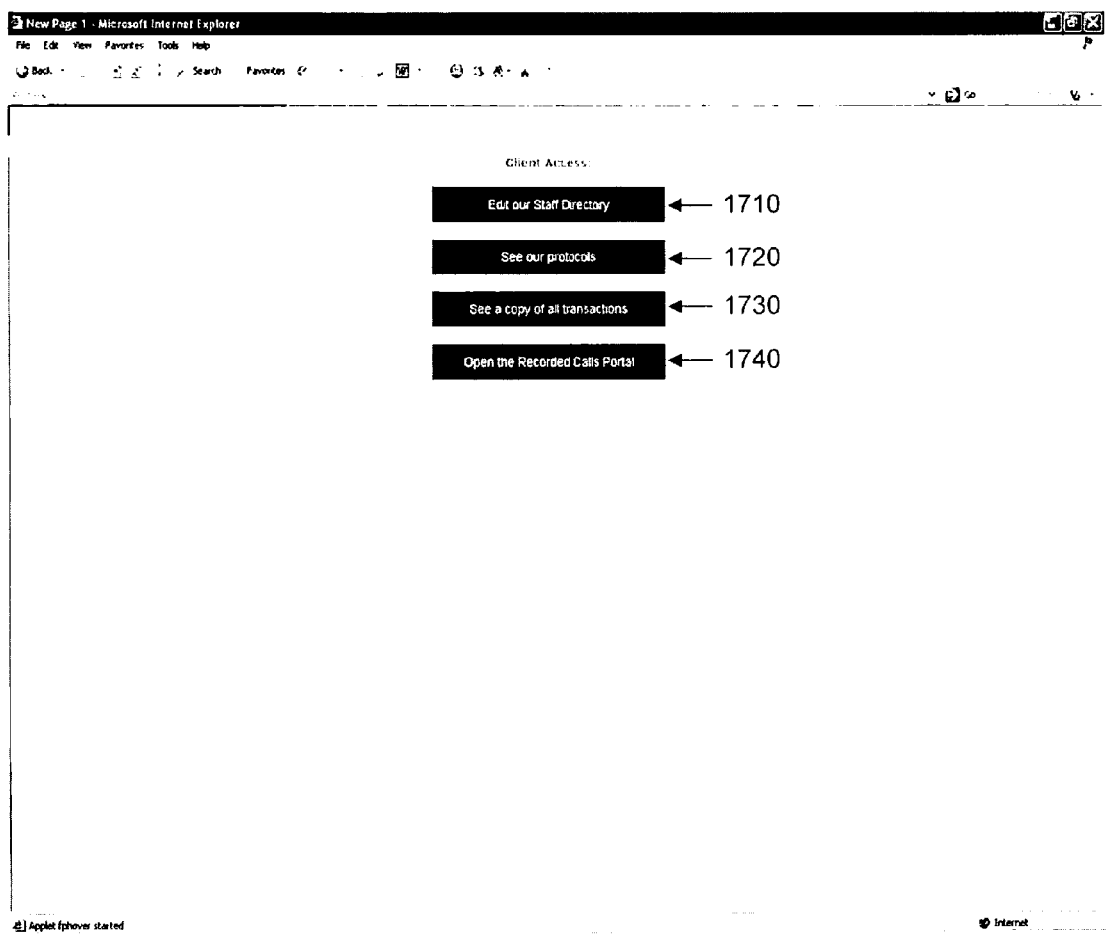

Referring now to FIG. 17, when a client wishes to access different portions of the GUI to address what a call agent views on the GUI. Specifically, options include "edit our staff directory" 1710; "see our protocols" 1720; "see a copy of all transactions" 1730; "open the recorded call portal" 1740. These links can be provided to a client as a web link to enable modification of their database, review call handling protocols, view call transactions, listen to recorded calls, or view call handling performance statistics.

Figure 18:
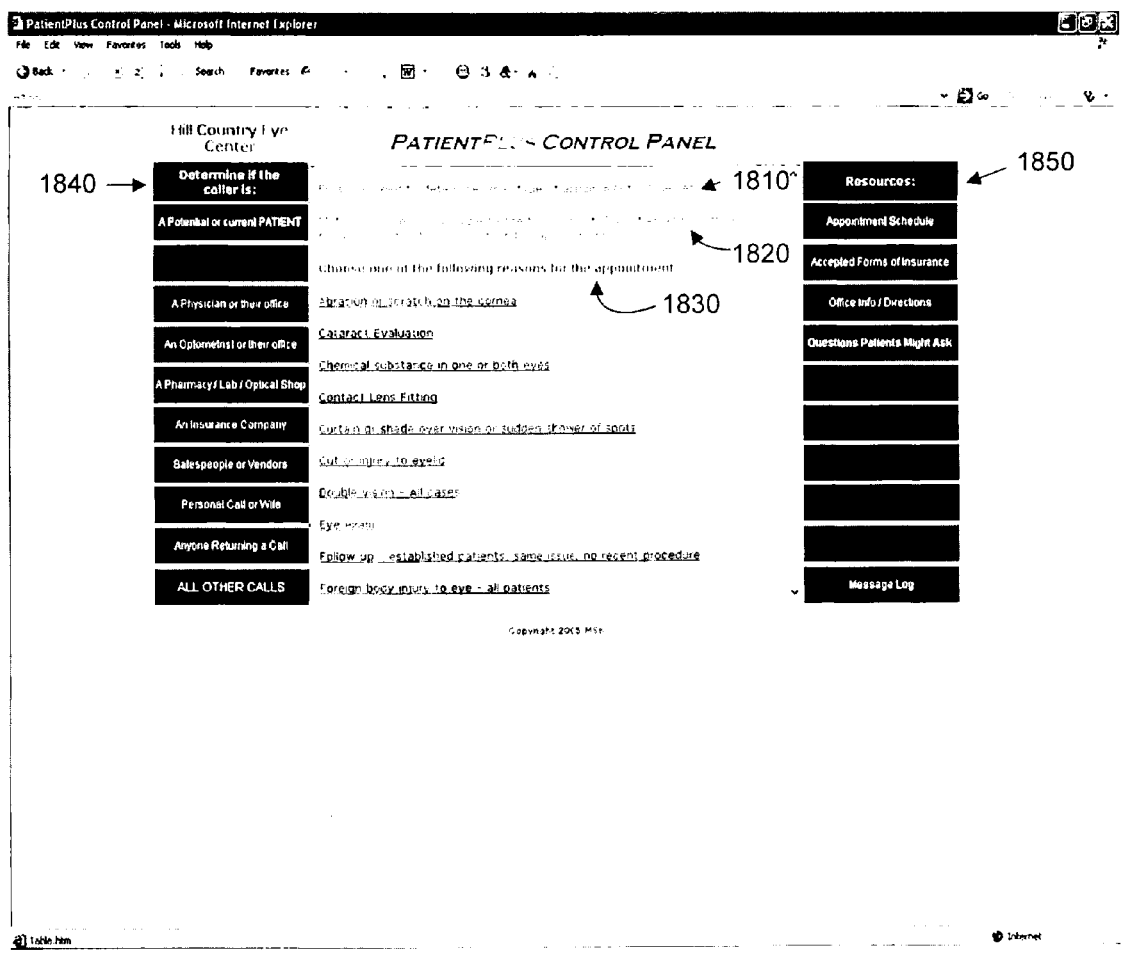

Referring now to FIG. 18, an example is provided for a client that operates an eye center. In this example, similar to the options provided in the example illustrated in FIG. 9, the GUI illustrated in FIG. 18 provides different caller type options on a sidebar 1840, and resources along another sidebar 1850. The center portion includes directions to a call agent. For example, statement 1810 provides for first determining the type of appoint that will be set. Statement 1820 provides for matching as closely as possible to the following list. "Do not email the office because we didn't know what kind of appointment to set." Statement 1830 provides for choosing the reason for the appointment. The optional reasons for an appointment are provided as "abrasion or scratch on the cornea" "cataract evaluation" "chemical substance in one or both eyes" "contact lens fitting" "curtain or shade over vision or sudden shower of spots" "cut or injury to eyelid" "double vision—all cases" "eye exam" "follow up—established patients, same issue, no recent procedure" and "foreign body injury to eye—all patients".

Figure 19:
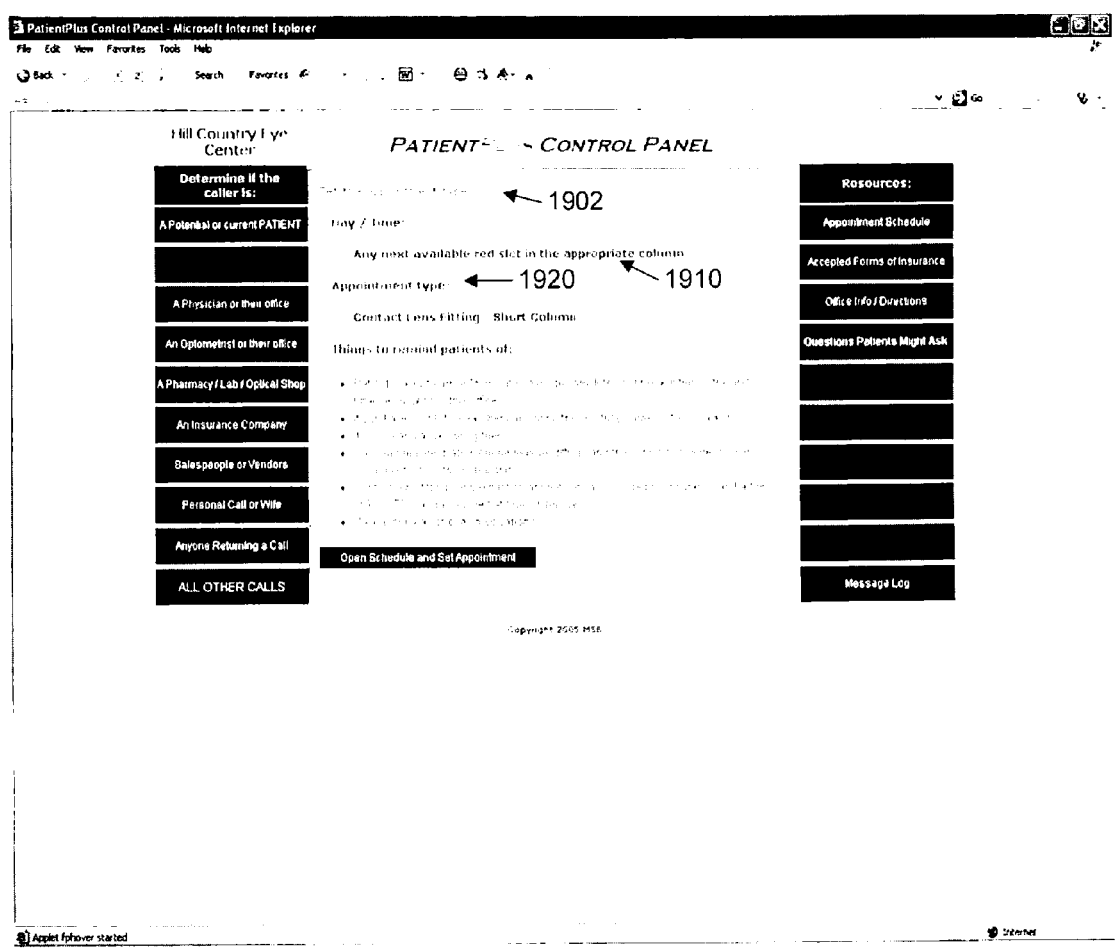

Referring now to FIG. 19, an exemplary GUI page illustrates a link from the GUI page shown in FIG. 18. Specifically, if a call agent determines that a caller wants to make an appointment for a lens fitting. As illustrated, the sidebars remain on the GUI after linking. The center portion is populated with protocol instructions for the call center agent including to set the appointment 1910. The option to include the day and time is illustrated in red with the protocol instruction 1910. The appointment type 1920 is also illustrated. In the example, a list of instructions is provided for the call center agent to read to a caller. Here, the things to remind a patient are included as bullets, including notes that patients need to arrive 15 minutes early to complete paperwork if it is the first time being seen in the office and the like.

Figure 20:
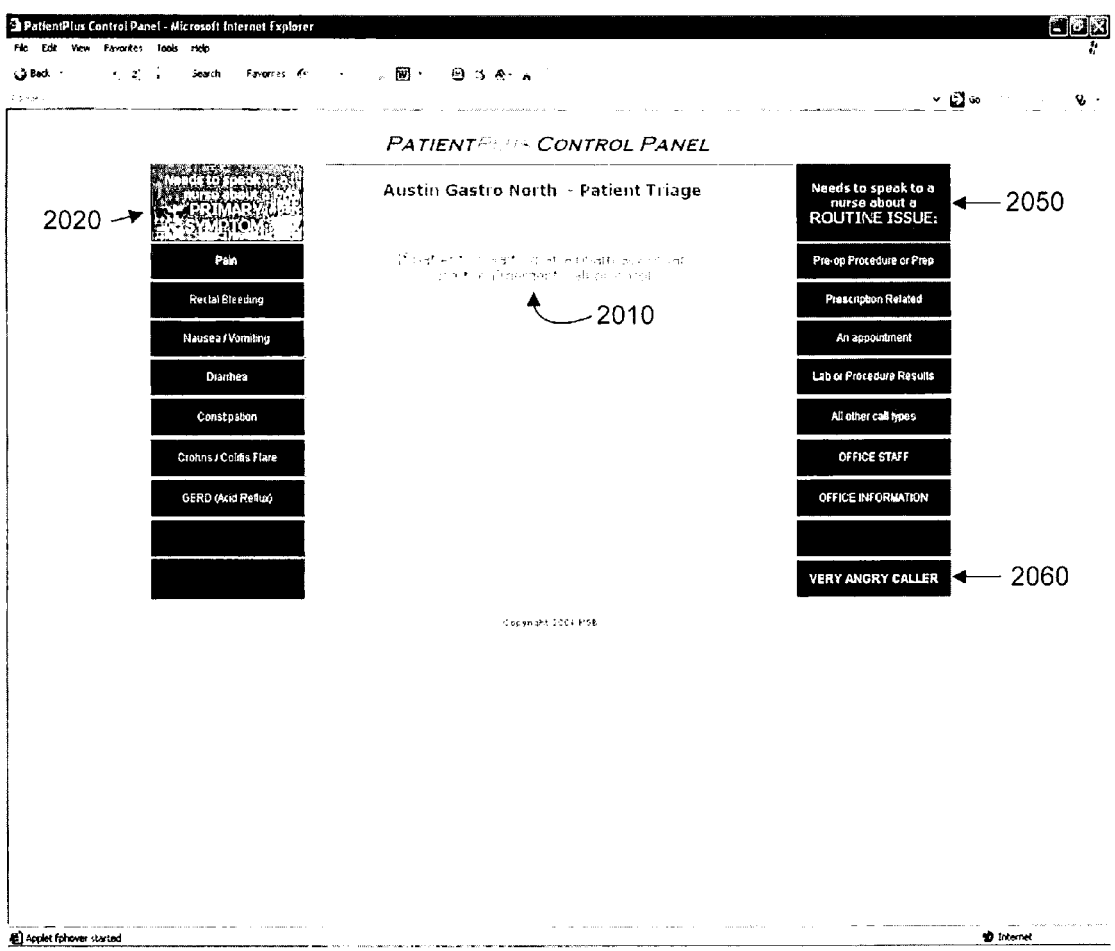

Referring now to FIG. 20, another sample of a GUI personalized for a client is illustrated. As shown, this example is for a gastrological office wherein a patient wants to speak with a nurse. FIG. 20 is organized to enable a call agent to perform patient triage before being passed to a nurse. Thus, in one embodiment, calls are initially answered by a client's phone system and callers are presented with a menu. Then, only certain selections are routed to the call center. In one embodiment, only calls from patients that wish to speak with a nurse are sent to a call agent in a manner in which the caller type is already determined and the call must be triaged. The center panel of the GUI provides a note 2010 that provides that if a patient is waiting at a pharmacy or lab, use the emergent call protocol. Each of the side bars is populated with issues concerning why a patient would need to speak with a nurse. On the left side includes possible primary symptoms 2020. The list includes pain, rectal bleeding, nausea/vomiting, diarrhea, constipation, crohns/colitis flare, and GERD. The right sidebar is populated with routine issues for speaking with a nurse 2050 including pre-op procedure, prescription, appointment, lab results. On the lower right sidebar, other staple information is included; including a link for all other call types, staff directory and office information. At the bottom of the sidebar, a link 2060 connects a call agent to a protocol for the very angry caller.

Figure 21:
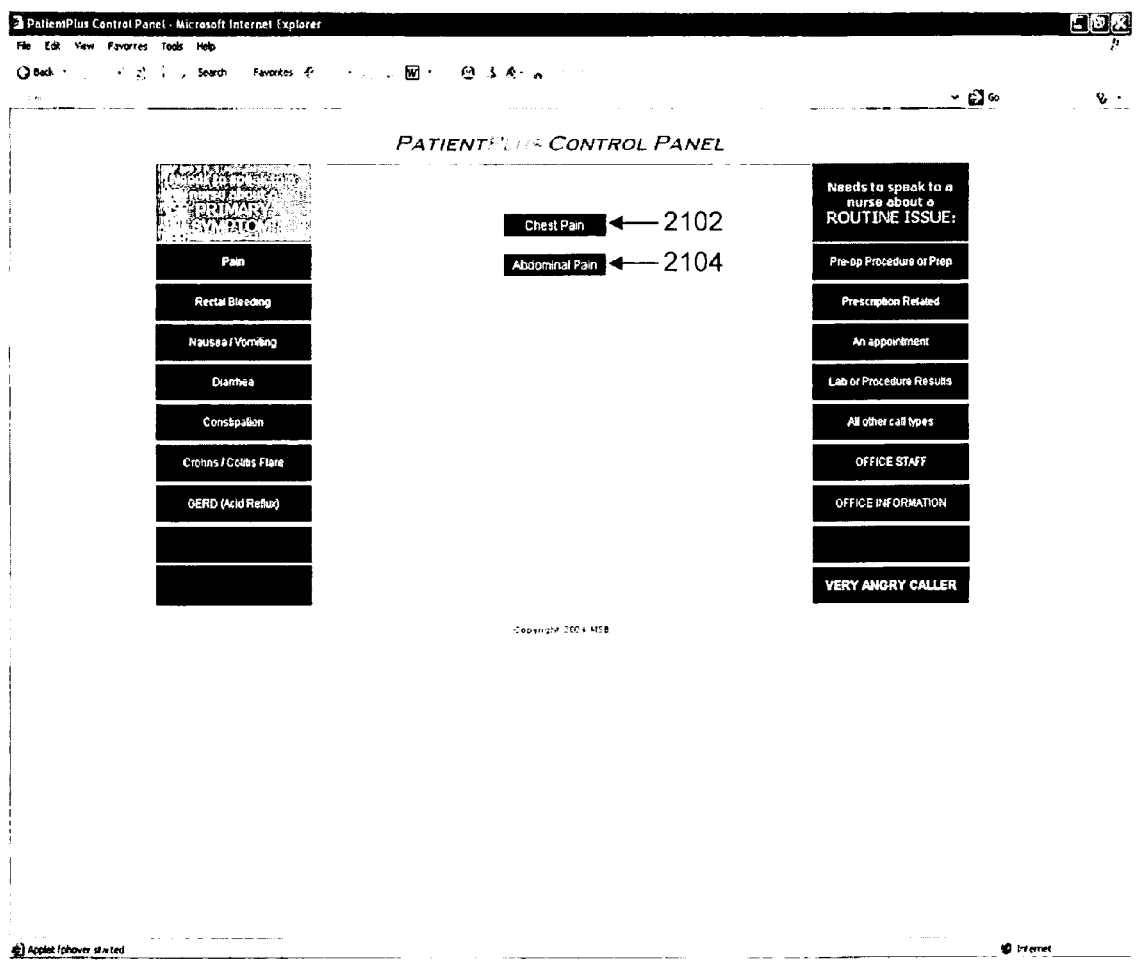

Referring now to FIG. 21, if call agent selects pain as the primary symptom, the center part of the GUI provides options 2102, chest pain, or 2104, abdominal pain.

Figure 22:
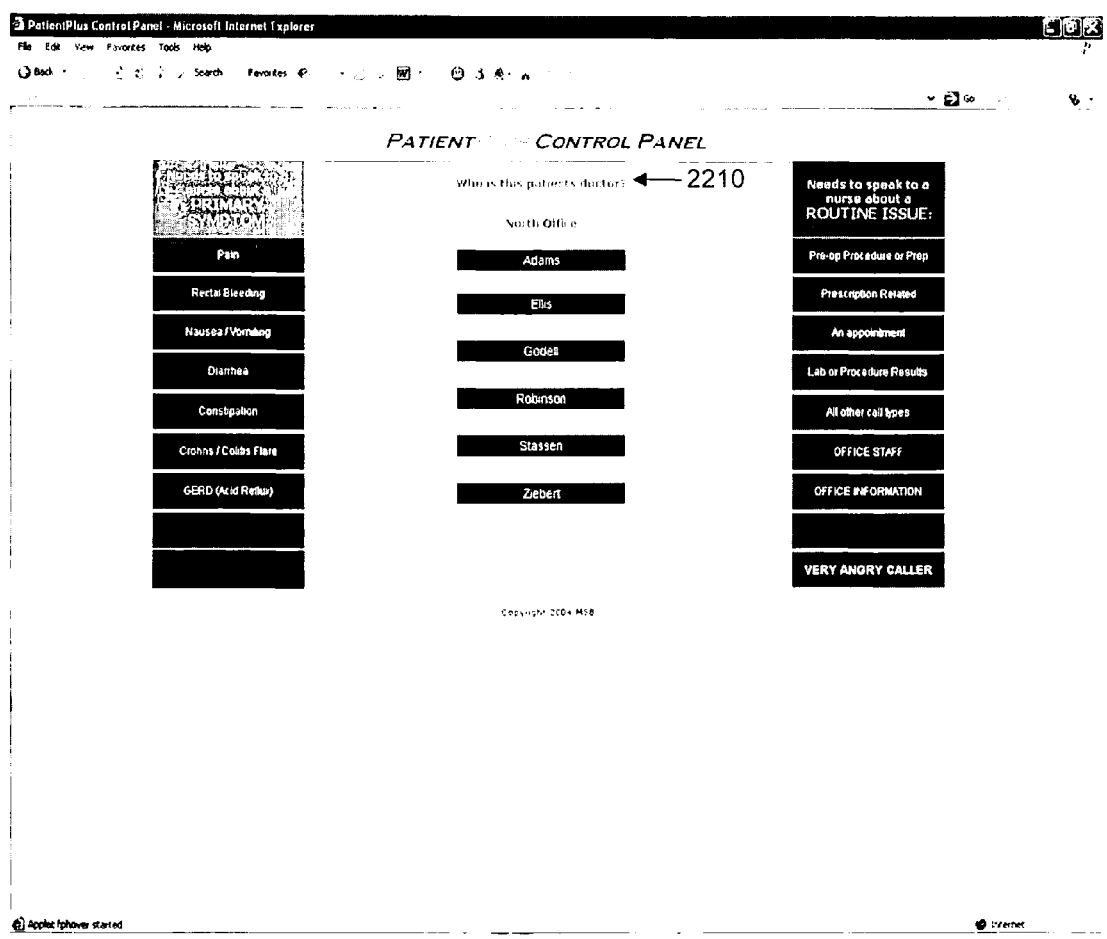

Referring now to FIG. 22, after a type of pain is chosen, the center of the GUI then instructs the call agent to have the patient identify which doctor is the patients doctor 2210. The center portion of the GUI then provides links to each doctor.

Figure 23:
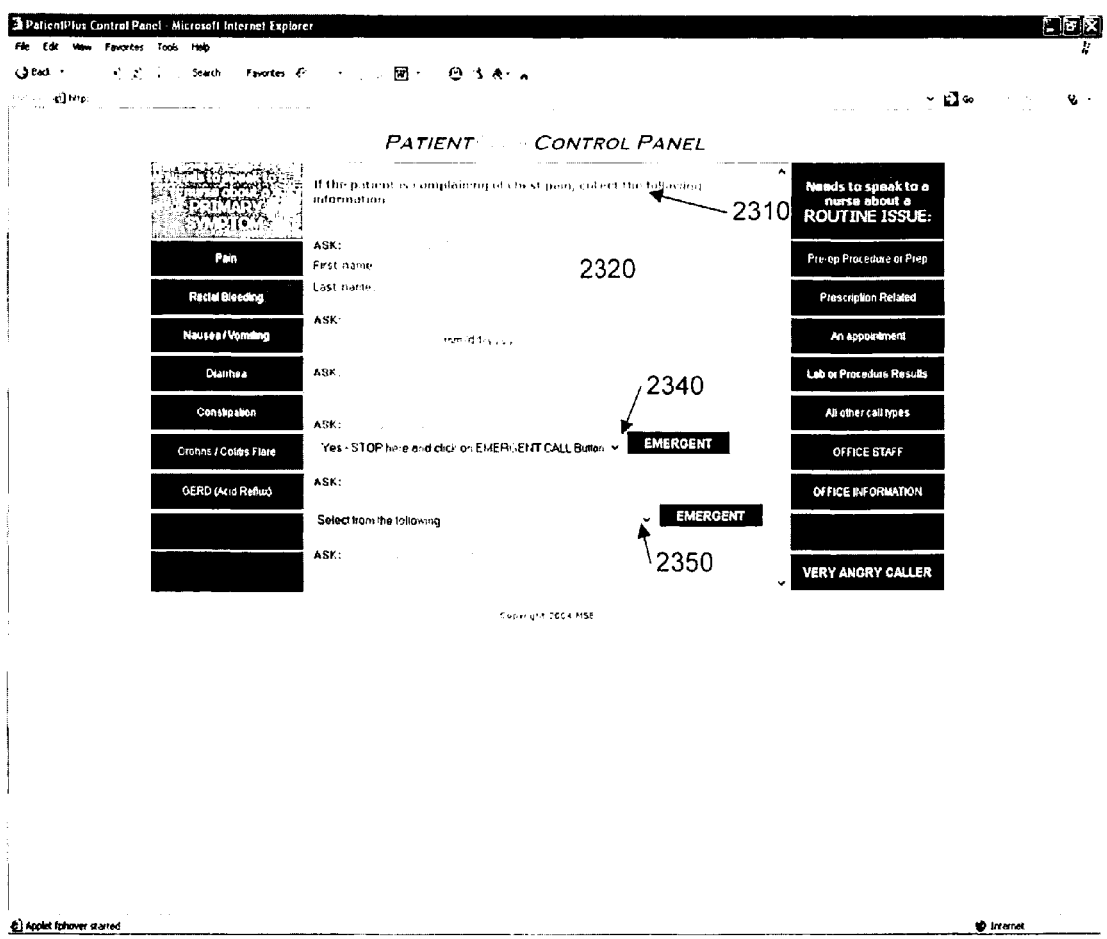

Referring now to FIG. 23, after the doctor is determined, the center portion of the GUI alters to enable the call agent to collect information 2310 concerning the pain complaint. Questions 2320 provide for asking the patient their full name, their date of birth, social security number, whether they have had a procedure in the last 3 days, extent of pain, and when the pain began. Depending on the patient's answers, pull down menus 2340 and 2350 can direct the call agent to connect the patient directly to a nurse as an "emergent" call and/or to follow further emergent protocols.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

I claim:

1. A method for operating a server computer to provide an interactive application to enable a plurality of client-specific protocols for a remote call center, the remote call center configured to receive a plurality of calls for a plurality of clients, the method comprising:
   linearly administering a plurality of states defined in a process map of client-specific protocols for a plurality of call types expected to be received for each client;
   displaying the process map at the remote call center via a graphical user interface;
   enabling a client to remotely alter the process map over an internet connection in near real-time; and
   enabling staff at the remote call center to respond to a unique call type beyond the scope of the process map by providing a data information request to the client over the internet connection.

2. The method of claim 1 wherein the displaying the process map at the remote call center via a graphical user interface includes:
   providing the graphical user interface with a centrally visible panel for displaying a script for the staff at the remote call center to read and centrally-located process map predicted options to expect from a caller.

3. The method of claim 1 further comprising:
   providing the process map as a health care-oriented process, the health care-oriented process including providing staff at the remote call center with protocols enabling collection of health care triage data for near real-time dissemination to the client.

4. The method of claim 1 wherein the displaying the process map at the remote call center via a graphical user interface includes:
   providing the graphical user interface with peripherally visible client-specific information sources.

5. The method of claim 1 wherein the enabling a client to remotely alter the process map over an internet connection in near real-time includes:
 displaying the process map via the internet connection as a database interface to enable the client to add, delete, and/or edit the client-specific protocols.

6. The method of claim 5 wherein the database interface enables the client to enter one or more records specific to a caller, a caller type, and/or an individual requested by a caller.

7. The method of claim 1 wherein the enabling staff at the remote call center to respond to a unique call type beyond the scope of the process map by providing a data information request to the client over the internet connection includes:
 displaying an option to the staff responsive to an input identifying the unique call type as beyond the scope of the process map.

8. The method of claim 1 wherein the enabling staff at the remote call center to respond to a unique call type beyond the scope of the process map by providing a data information request to the client over the internet connection includes:
 enabling the remote call center to respond to an instruction received over the internet connection from the client by incorporating instructions received by the client into an interaction with a caller.

9. A computer system comprising:
 a processor;
 a memory coupled to the processor;
 an interactive application module coupled to the memory, the interactive application module configured to respond to an incoming call received at a call center and enable the call center to linearly administer a plurality of states in a process map associated with a client requested by the incoming call, the process map including a plurality of client-specific protocols for a plurality of call types expected to be received for each client, each client designated by a caller identification, the interactive application module responsive to inputs to dynamically alter one or more of the plurality of states in the process map by the client over an internet connection in near real-time, the interactive application module further enabling staff at the remote call center to respond to a unique call type beyond the scope of the process map by providing a data information request to the client over the internet connection.

10. The computer system of claim 9 wherein the processor is configured to process the incoming call according to client-determined specifications including requiring the call center to answer all calls for the client, and/or receiving the incoming call after routing from the client, and/or receiving predetermined types of incoming calls to be intercepted by the interactive application.

11. The computer system of claim 9 wherein the processor is configured to retrieve identification data from the memory to match the caller identification of the client via a database configured to match the caller identification to an identifier, the identifier matching the caller identification of the incoming call to the requested client and associated process map.

12. The computer system of claim 9 wherein the processor is configured to route the incoming call at the call center to a terminal assigned to the requested client, the terminal executing the process map associated with the requested client.

13. The computer system of claim 9 wherein the interactive application module includes a process map module configured to initiate a client-specific protocol determined by an identification of the client requested by the incoming call, the client-specific protocol configured according to one or more client-specific office procedures.

14. The computer system of claim 9 wherein the interactive application module is configured to instantiate a question and answer format to enable staff at the call center interact with the incoming call to collect information, triage the incoming call, set one or more appointments, and/or screen the incoming call.

15. The computer system of claim 9 wherein the interactive application module is configured to record one or more call transactions associated with the client to enable client access to the one or more call transactions over an internet connection.

16. A computer program product comprising a non-transitory computer readable medium configured to perform one or for acts to enable a plurality of client-specific protocols for a remote call center, the remote call center configured to receive a plurality of calls for a plurality of clients, the one or more acts comprising:
 one or more instructions for linearly administering a plurality of states defined in a process map of client-specific protocols for a plurality of call types expected to be received for each client;
 one or more instructions for displaying the process map at the remote call center via a graphical user interface;
 one or more instructions for enabling a client to remotely alter the process map over an internet connection in near real-time; and
 one or more instructions for enabling staff at the remote call center to respond to a unique call type beyond the scope of the process map by providing a data information request to the client over the internet connection.

17. The computer program product of claim 16 wherein the one or more instructions for displaying the process map at the remote call center via a graphical user interface includes:
 one or more instructions for providing the graphical user interface with a centrally visible panel for displaying a script for the staff at the remote call center to read and centrally-located process map predicted options to expect from a caller.

18. The computer program product of claim 16 wherein the one or more instructions further comprises:
 one or more instructions for providing the process map as a health care-oriented process, the health care-oriented process including providing staff at the remote call center with protocols enabling collection of health care triage data for near real-time dissemination to the client.

19. The computer program product of claim 16 wherein the one or more instructions for displaying the process map at the remote call center via a graphical user interface includes:
 one or more instructions for providing the graphical user interface with peripherally visible client-specific information sources.

20. The computer program product of claim 16 wherein the one or more instructions for enabling a client to remotely alter the process map over an internet connection in near real-time includes:
 one or more instructions for displaying the process map via the internet connection as a database interface to enable the client to add, delete, and/or edit the client-specific protocols.

21. The computer program product of claim 20 wherein the database interface enables the client to enter one or more records specific to a caller, a caller type, and/or an individual requested by a caller.

22. The computer program product of claim 16 wherein the one or more instructions for enabling staff at the remote call center to respond to a unique call type beyond the scope of the process map by providing a data information request to the client over the internet connection includes:

one or more instructions for displaying an option to the staff responsive to an input identifying the unique call type as beyond the scope of the process map.

23. The computer program product of claim 16 wherein the one or more instructions for enabling staff at the remote call center to respond to a unique call type beyond the scope of the process map by providing a data information request to the client over the internet connection includes:

one or more instructions for enabling the remote call center to respond to an instruction received over the internet connection from the client by incorporating instructions received by the client into an interaction with a caller.

* * * * *